(12) United States Patent
Del Vecchio et al.

(10) Patent No.: US 9,754,491 B2
(45) Date of Patent: Sep. 5, 2017

(54) SYSTEMS AND METHODS FOR PROVIDING SENSOR-BASED LOCATION PROXIMITY DETECTION AND NOTIFICATION

(71) Applicant: The Toronto-Dominion Bank, Toronto (CA)

(72) Inventors: Orin Del Vecchio, Richmond Hill (CA); Lauren Van Heerden, Bedford, NH (US); Gunalan Nadarajah, Milton (CA); Jonathan K. Barnett, Oakville (CA); Ashraf Metwalli, Toronto (CA); Jakub Danielak, Toronto (CA); Michael Loughry, Toronto (CA); Daniel M. Siegel, Toronto (CA); Nikolas Sawtschuk, Mississauga (CA); Sultan Mehrabi, Toronto (CA); Paul Mon-Wah Chan, Markham (CA); Matthew Hamilton, Toronto (CA); Christianne Moretti, Richmond Hill (CA); John Barbon, London (CA)

(73) Assignee: The Toronto-Dominion Bank, Toronto (CA)

( * ) Notice: Subject to any disclaimer, the term of this patent is extended or adjusted under 35 U.S.C. 154(b) by 57 days.

(21) Appl. No.: 14/793,915

(22) Filed: Jul. 8, 2015

(65) Prior Publication Data

US 2016/0012729 A1    Jan. 14, 2016

Related U.S. Application Data

(60) Provisional application No. 62/022,119, filed on Jul. 8, 2014.

(51) Int. Cl.
*G08G 1/00* (2006.01)
*G06Q 10/10* (2012.01)
*H04W 4/02* (2009.01)

(52) U.S. Cl.
CPC ............ *G08G 1/205* (2013.01); *G06Q 10/109* (2013.01); *G08G 1/20* (2013.01); *H04W 4/022* (2013.01); *H04W 4/023* (2013.01)

(58) Field of Classification Search
CPC ........ H04W 24/02; H04W 4/02; H04W 64/00
(Continued)

(56) References Cited

U.S. PATENT DOCUMENTS 6,424,910 B1    7/2002  Ohler et al.
6,700,506 B1    3/2004  Winkler et al.
(Continued)

FOREIGN PATENT DOCUMENTS

EP        1705932      9/2006
EP        2282168      2/2011
GB        2423889      9/2006

OTHER PUBLICATIONS

Hermann et al., "Concept for Hierarchical and Distributed Processing of Area Based Triggers," Fourth Annual IEEE International Conference on Pervasive Computing and Communications, 2006 (11 pages).
(Continued)

*Primary Examiner* — Vladimir Magloire
*Assistant Examiner* — Donald H Braswell
(74) *Attorney, Agent, or Firm* — Duane Morris LLP

(57) ABSTRACT

The disclosed embodiments include methods and systems for providing a notification relating to a geographical boundary based on monitored sensor data collected by networked devices. The disclosed embodiments include, for example, a method for receiving, by one or more processors, a request to establish a first boundary around a first location. The method may also include monitoring, by the one or more processors, one or more triggering devices. The method may also include calculating, by the one or more processors, a
(Continued)

first boundary extent delimiting the geographical area of the first boundary based on one or more boundary extent parameters. The method may also include detecting, by the one or more processors, whether at least one of the one or more triggering devices is located within the first boundary extent. The method may also include, when the at least one of the one or more triggering devices is detected within the first boundary extent, sending, by the one or more processors, a notification to a client device based on the determining.

30 Claims, 9 Drawing Sheets

(58) Field of Classification Search
USPC .................................................. 455/456.1
See application file for complete search history.

(56) References Cited

U.S. PATENT DOCUMENTS

| | | |
|---|---|---|
| 6,748,320 B2 | 6/2004 | Jones |
| 6,804,606 B2 | 10/2004 | Jones |
| 6,823,188 B1 | 11/2004 | Stern |
| 6,980,131 B1 | 12/2005 | Taylor |
| 7,273,172 B2 | 9/2007 | Olsen, III et al. |
| 7,289,814 B2 | 10/2007 | Amir et al. |
| 7,561,063 B2 | 7/2009 | Eckhart |
| 7,822,426 B1 | 10/2010 | Wuersch |
| 7,999,701 B1 | 8/2011 | Xu et al. |
| 8,115,625 B2 | 2/2012 | Yoshioka et al. |
| 8,125,332 B2 | 2/2012 | Curran et al. |
| 8,165,773 B1 | 4/2012 | Chavez et al. |
| 8,204,682 B2 | 6/2012 | Hatami |
| 8,243,897 B2 | 8/2012 | Groth |
| 8,284,076 B1 | 10/2012 | Horstemeyer |
| 8,326,315 B2 | 12/2012 | Phillips et al. |
| 8,441,367 B1 | 5/2013 | Lee et al. |
| 8,531,293 B2 | 9/2013 | Putz |
| 8,536,999 B2 | 9/2013 | Holcman et al. |
| 8,538,458 B2 | 9/2013 | Haney |
| 8,588,814 B2 | 11/2013 | Jayanthi |
| 8,593,277 B2 | 11/2013 | Nath et al. |
| 8,624,723 B2 | 1/2014 | Troxler |
| 8,626,184 B2 | 1/2014 | Dicke |
| 8,644,848 B2 | 2/2014 | Williams et al. |
| 8,645,050 B2 | 2/2014 | Gontmakher et al. |
| 8,653,956 B2 | 2/2014 | Berkobin et al. |
| 8,666,660 B2 | 3/2014 | Sartipi et al. |
| 8,682,363 B1 | 3/2014 | Cardi et al. |
| 8,686,852 B2 | 4/2014 | Ben-Dayan et al. |
| 9,230,292 B2* | 1/2016 | Amin ..................... G06Q 50/30 |
| 2005/0157689 A1 | 7/2005 | Schnurr |
| 2006/0111955 A1 | 5/2006 | Winter et al. |
| 2007/0210936 A1 | 9/2007 | Nicholson |
| 2008/0167937 A1* | 7/2008 | Coughlin ............... G01C 21/20 705/7.16 |
| 2009/0017803 A1* | 1/2009 | Brillhart ................ G01C 21/20 455/414.2 |
| 2010/0042940 A1 | 2/2010 | Monday et al. |
| 2010/0191454 A1 | 7/2010 | Shirai et al. |
| 2011/0148626 A1 | 6/2011 | Acevedo |
| 2012/0239584 A1 | 9/2012 | Yariv et al. |
| 2013/0103606 A1 | 4/2013 | Holliday |
| 2013/0130718 A1 | 5/2013 | Sharma et al. |
| 2013/0311567 A1 | 11/2013 | Lee |
| 2013/0331087 A1 | 12/2013 | Shoemaker et al. |
| 2013/0331127 A1 | 12/2013 | Sabatelli et al. |
| 2013/0332067 A1 | 12/2013 | Schlesinger et al. |
| 2014/0074743 A1 | 3/2014 | Rademaker |
| 2014/0135039 A1* | 5/2014 | Sartipi .................. H04W 4/021 455/456.3 |
| 2014/0171013 A1 | 6/2014 | Varoglu et al. |
| 2014/0179344 A1 | 6/2014 | Bansal et al. |

OTHER PUBLICATIONS

Munson et al., "Location-based notification as a general-purpose service," Proceedings of the $2^{nd}$ International Workshop on Mobile Commerce, 2002, pp. 40-44.

Safar et al., "Virtual Social Networks Online and Mobile Systems," $1^{st}$ International Conference on the Applications of Digital Information and Web Technologies, 2008 (8 pages).

"Locqus releases en route notifications. enabling businesses to update real-time eta for customers," Manufacturing Close-Up, Mar. 23, 2014 (2 pages).

Hsieh et al., "Experimental Validation of an Algorithm for Cooperative Boundary Tracking," Proceedings of the American Control Conference, 2005, pp. 1078-1083.

An et al., "A Gaussian Mixture Model for Mobile Location Prediction," Research, Innovation and Vision for the Future, 2007, pp. 152-157.

Siksnys et al. "Private and Flexible Proximity Detection in Mobile Social Networks," Eleventh International Conference on Mobile Data Management, 2010 (10 pages).

Li et al., "Nearby Friend Alert: Location Anonymity in Mobile Geosocial Networks," Pervasive Computing, vol. 12, No. 4, 2013, pp. 62-70.

Al-Mazloum et al., "GPS and SMS-Based Child Tracking System Using Smart Phone," International Journal of Electrical, Electronic Science and Engineering, vol. 7, No. 2, 2013, pp. 1-4.

* cited by examiner

SYSTEMS AND METHODS FOR PROVIDING SENSOR-BASED LOCATION PROXIMITY DETECTION AND NOTIFICATION

CROSS-REFERENCE TO RELATED APPLICATIONS

This application claims the benefit of priority to U.S. Provisional Patent Application No. 62/022,119, filed Jul. 8, 2014, the entire disclosure of which is expressly incorporated herein by reference to its entirety.

BACKGROUND

Technical Field

The disclosed embodiments generally relate to systems, methods, and apparatuses for proximity detection, and for example, and without limitation, to systems and methods for providing proximity detection and notification processes based on monitored sensor data obtained from network devices.

Background

Today, people often find themselves waiting at a particular location for another individual, a service, or other entity. For example, goods and service providers give their customers fixed or variable periods of time in which the customer must remain in his or her home to await a service. Many customers, however, find it cumbersome to remain in their homes for long stretches of time, and would benefit from the ability to run errands or receive real-time updates on the expected arrival time of a service.

Aspects of the disclosed embodiments include systems and methods to providing dynamic proximity detection about a fixed location.

SUMMARY

The disclosed embodiments include systems and methods for providing dynamic proximity detection about a fixed location.

The disclosed embodiments include a storage device and at least one processor coupled to the storage device. The storage device may store software instructions for controlling the at least one processor when executed by the at least one processor. The at least one processor may be operative with the software instructions to determine at least one first boundary extent parameter relevant to an expected arrival time of one or more triggering devices at a first location. The at least one processor may be further operative with the software instructions to monitor the one or more triggering devices to obtain first boundary extent information reflecting the at least one first boundary extent parameter. In one aspect, the one or more triggering devices may be connected to the system across a corresponding network. The at least one processor may also be operative with the software instructions to calculate, based on the first boundary extent information, a first boundary extent delimiting a first geographical area of a first boundary disposed about the first location. In some aspects, the first boundary may be associated with the expected arrival time of the one or more triggering devices at the first location. The at least one processor may be further operative with the software instructions to detect, based on the first boundary extent information, whether at least one of the one or more triggering devices is located within the first boundary extent, and to transmit a first notification to a client device, when the at least one triggering device is detected within the first boundary extent.

The disclosed embodiments also provide a computer-implemented method that determines, by one or more processors, at least one first boundary extent parameter relevant to an expected arrival time of one or more triggering devices at a first location. The method also includes monitoring, by the one or more processors, the one or more triggering devices to obtain first boundary extent information reflecting the at least one first boundary extent parameter. The method also calculates, by the one or more processors, and based on the first boundary extent information, a first boundary extent delimiting a first geographical area of a first boundary disposed about the first location. In one aspect, the first boundary may be associated with the expected arrival time of the one or more triggering devices at the first location. Based on the first boundary extent information, the method also includes detecting, by the one or more processors, whether at least one of the triggering devices is located within the first boundary extent. When the at least one triggering device is detected within the first boundary extent, the method further includes transmitting, by the one or more processors, a first notification to a client device.

In additional disclosed embodiments, a tangible, non-transitory computer-readable medium stores instructions that, when executed by at least one processor, cause the at least one processor to perform a method. he method may include determining at least one first boundary extent parameter relevant to an expected arrival time of one or more triggering devices at a first location, and monitoring the one or more triggering devices to obtain first boundary extent information reflecting the at least one first boundary extent parameter. The method may also include calculating and based on the first boundary extent information, a first boundary extent delimiting a first geographical area of a first boundary disposed about the first location. In one aspect, the first boundary may be associated with the expected arrival time of the one or more triggering devices at the first location. Based on the first boundary extent information, the method may include detecting whether at least one of the triggering devices is located within the first boundary extent. The method may also transmit a first notification to a client device, when the at least one triggering device is detected within the first boundary extent.

Additional objects and advantages of the disclosed embodiments will be set forth in part in the description that follows, and in part will be obvious from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments as claimed.

The accompanying drawings constitute a part of this specification. The drawings illustrate several embodiments of the present disclosure and, together with the description, serve to explain the principles of the disclosed embodiments as set forth in the accompanying claims.

DESCRIPTION OF THE EMBODIMENTS

Reference will now be made in detail to embodiments of the present disclosure, examples of which are illustrated in the accompanying drawings. Wherever possible, the same reference numbers will be used throughout the drawings to refer to the same or like parts.

The disclosed embodiments include systems and methods that enable a user to receive notifications indicative of a presence of a triggering device within a predetermined distance or travel time of a specified geographic location. For instance, a user, Joe, may be working from his home office for the day when he experiences a total loss of cable internet connectivity. After discussions with his cable provider, Joe schedules a service appointment during a temporal window from 12:00 p.m. to 5:00 p.m. Rather than waiting for the repair crew to arrive, Joe decides to travel into the office, which without traffic would require thirty minutes, but with rush hour traffic, could require forty-five to sixty minutes. The disclosed embodiments may be configured to enable Joe, through, for example, a mobile device, to transmit his current location to a computerized system, which may establish a virtual boundary about Joe's current location. The computerized system may, for example, be configured to monitor a position, speed, and/or direction of Joe's mobile device (and thus, of Joe himself) relative to a comparable position, speed, and/or direction of one or more mobile devices and/or computer systems associated with the repair crew. In some aspects, the computerized system may be configured to adjust the virtual boundary to ensure that a travel time between Joe's current geographic position (e.g., as established by Joe's mobile device) and Joe's home is less than a time required by the repair crew to travel from the virtual boundary to Joe's home. When the computerized system detects that the at least one of the repair crew's mobile devices intersect the virtual boundary, the computerized system may provide a notification to Joe's mobile device. In response to the notification, Joe may travel home from the office with confidence that he will arrive before the repair crew. This example is one of many applications that the disclosed embodiments may be implemented. Other aspects, features, and functionalities of the disclosed embodiments are described below.

Figure 1:
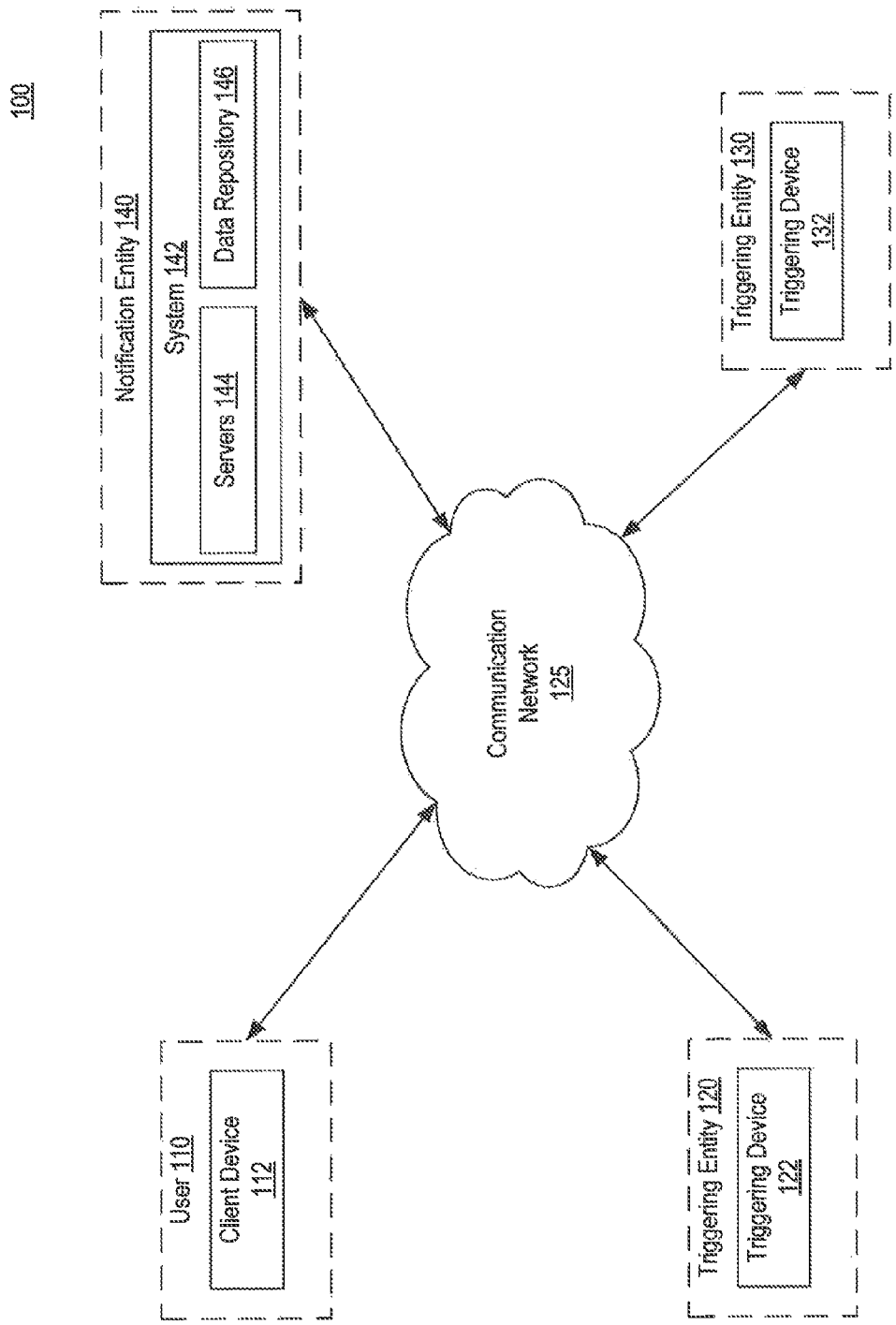
FIG. 1 depicts an exemplary computing environment consistent with disclosed embodiments.

FIG. 1 depicts an exemplary computing environment 100 consistent with the disclosed embodiments. In one aspects, computing environment 100 may include one or more systems (e.g., system 142), which may be associated with one or more notification entities (e.g., entities 140). In additional aspects, environment 100 may include one or more client devices (e.g., client devices 112), which may be associated with respective one or more users (e.g., users 110, 120, and 132). Environment 100 may also include one or more triggering devices (e.g., triggering devices 122 and 132), which may be associated with one or more triggering entities (e.g., triggering entities 120 and 130).

In some aspects, one or more of triggering devices 122 and 132 may be in possession of a corresponding one of triggering entities 120 and 130 (e.g., a smart phone carried by a user). Additionally or alternatively, one or more of triggering devices 122 and 132 may be owned by or under the control of one or more of triggering entities 120 and 130 (e.g., a drone operated by a user). The exemplary triggering entities described above are not limited to single or multiple users, and in additional embodiments, triggering entities 120 and/or 130 may include one or more organizations, business entities, governmental entities, and other non-human entities (e.g., delivery services, transit agencies, etc.). Further, in additional aspects, triggering devices 122 and/or 132 may include, but are not limited to, drones (e.g., to deliver packages, etc.), automated and/or driverless cars, and automated and/or driverless transmit vehicles (e.g., automated subways).

In some embodiments, environment 100 may include communication network 125. In some aspects, communication network 125 may represent any type of network or medium of digital communication for transmitting information between computing devices. For example, communication network 125 may include a LAN, a wireless LAN, a cellular network, a GSM network, a satellite network, an RF network, a Near Field Communication (NFC) network (e.g., a WiFi network), a wireless Metropolitan Area Network (MAN) connecting multiple wireless LANs, NFC communication link(s), any physical wired connection (e.g., via an I/O port), and a WAN (e.g., the Internet). In some embodiments, communication network 125 may be secured through physical encryption (e.g., line encryption), by requiring information to be encrypted on other computer systems (e.g., end encryption), and the like.

In certain aspects, communication network 125 may include any accessible network or networks interconnected via one or more communication protocols, including hypertext transfer protocol (HTTP) and transmission control protocol/internet protocol (TCP/IP). Communications protocols consistent with the disclosed embodiments also include protocols facilitating data transfer using radio frequency identification (RFID) communications and/or NFC. In some aspects, communication network 125 may also include one or more mobile device networks, such as a GSM network or a PCS network, allowing devices (e.g., client device 112, a triggering device, etc.) to send and receive data via applicable communications protocols, including those described herein.

In certain aspects, environment 100 may include one or more systems (e.g., system 142) configured to process, store, receive, obtain, and transmit information. In certain aspects, system 142 may be configured to execute software instructions to perform one or more processes consistent with the disclosed embodiments. In one aspect, system 142 may be associated with one or more notification entities (e.g., notification entity 140), although such association is not required.

In some embodiments, notification entity 140 may include any entity storing, using, managing, or processing information related to providing proximity detection for a user or other entity. For example, in some aspects, an notification entity may include a business entity (e.g., a merchant, a cable company, a delivery service, a restaurant), financial institution, a governmental entity (e.g., a federal government agency, state or local body, a court, regulatory bodies, law enforcement, etc.), an educational entity (e.g., a university, local school, school board, etc.), a courier service (e.g., a post office, a private shipping or logistics service, etc.), other users, and the like. In some aspects, a financial institution may include a commercial bank, an investment bank, a provider of financial service accounts (e.g., checking, savings, credit, debit, reward, loyalty accounts, etc.), or a provider of payment instruments (e.g., a credit card, a debit card, a prepaid card, check instruments, etc.).

In certain aspects, system 142 may include one or more servers (e.g, servers 144), and one or more data storages (e.g., data repository 146). In some embodiments, server 144 may include software programs and one or more processors for executing the programs. Server 144 may be configured to execute software instructions to perform one or more processes consistent with the disclosed embodiments. In one embodiment, for example, a user device (e.g., devices 112, 122, and/or 132) and/or another computing system may exchange information facilitating execution of the one or more processes consistent with the disclosed embodiments. The software instructions of server 144 may be incorporated into a single computer, a single server, or any additional or alternative computing device apparent to one of ordinary skill in the art. Server 144 may also include distributed computing devices and computing systems, and may execute software instructions on separate computing systems and servers. System 142 may include one or more data repositories 146 configured to store information consistent with the disclosed embodiments (e.g., information related to, obtained from, and/or sent to triggering devices, user preferences received over communication network 125, etc.).

In some aspects, system 142 may include a computer having one or more processors selectively activated or reconfigured by a computer program. Such a computer may be configured as a particular computing system based on execution of software instructions that perform one or more processes consistent with the disclosed embodiments. In certain aspects, system 142 may be incorporated as corresponding nodes in a distributed network, and/or as corresponding networked servers in a cloud-computing environment. In one embodiment, system 142 may communicate with one or more additional servers that facilitate the distribution of processes for parallel execution by the additional servers.

In some embodiments, environment 100 may include one or more client devices (e.g., client device 112) and/or triggering device(s) (e.g., triggering devices 122 and/or 132). In certain embodiments, a client device and/or triggering device may include any computing, data transmitting, data receiving, or data processing device consistent with the disclosed embodiments. In some aspects, a triggering device may include a client device. In other embodiments, a client device may not be a triggering device.

In certain aspects, a client device or triggering device may include any device capable of providing and receiving information over a communication network (e.g., communication network 125). For example, a client device or triggering device may include a personal computer, a laptop computer, a tablet computer, a notebook computer, a handheld computer, a personal digital assistant, a portable navigation device, a mobile phone, a wearable device (e.g., a smart watch), an embedded device, a smartphone, an RFID device, a pager, and any additional or alternate device capable of receiving or providing information to communications network 125 (e.g., a computer system 200 of FIG. 2). Additionally or alternatively, client and triggering devices consistent with the disclosed embodiments may include a positioning device or sensor (e.g., global positioning system (GPS) unit, an RFID unit, etc.) capable obtaining positioning data indicative of a current geographic position of the corresponding client and/or triggering device. In certain aspects, the client and/or triggering devices may process the received positional data and transmit portions of the received positioning data to system 142 at regular or predetermined intervals, and/or in response to requests received from system 140. As described below, system 140 may process the received positional data to monitor current geographic positions of the client and/or triggering devices relative to each other and to one or more triggering locations.

In some embodiments, a client device may be associated with one or more users (e.g., user 110). In one example, a user may use client device to perform one or more processes consistent with the disclosed embodiments. For example, user 110 may use client device 112 to input information and to exchange information with other systems in environment 100, such as system 142 or another computing system in connection with communications network 125.

In certain embodiments, a triggering device may be configured to receive, process, and provide information over communications network 125 for use in processes consistent with the disclosed embodiments. In some aspects, a triggering device may be associated with one or more triggering entities (e.g., entities 120 and 130). In some aspects, a triggering entity may include any entity storing, using, requiring, managing, or processing information related to providing proximity detection for a user or other entity (e.g., any of the entities described in connection with notification entity 140, a separate business entity, a human user, etc.). In some embodiments, a triggering entity may be related to, concomitant with, or associated with notification entity 140, although such relationship is not required. In certain embodiments, system 142 may receive authorization from another computing system (e.g., a computing system associated with a notification entity 140, triggering entity 130, etc.) before system 142 is authorized or permitted to track and monitor a triggering device.

While FIG. 1 depicts environment 100 with a certain number of client devices (e.g., client device 112), triggering devices (e.g., triggering devices 122 and 132), communication networks 120, and systems 142, environment 100 may contain any number of such systems consistent with the disclosed embodiments. For example, environment 100 may include a plurality of client devices, each associated with a plurality of users. In certain aspects, environment 100 may include three or more triggering devices, which each may be associated with triggering entities (e.g., one or more users, business entities, etc.). Environment 100 may also include additional communication networks, and other networks not shown in FIG. 1 consistent with the disclosed embodiments.

Figure 2:
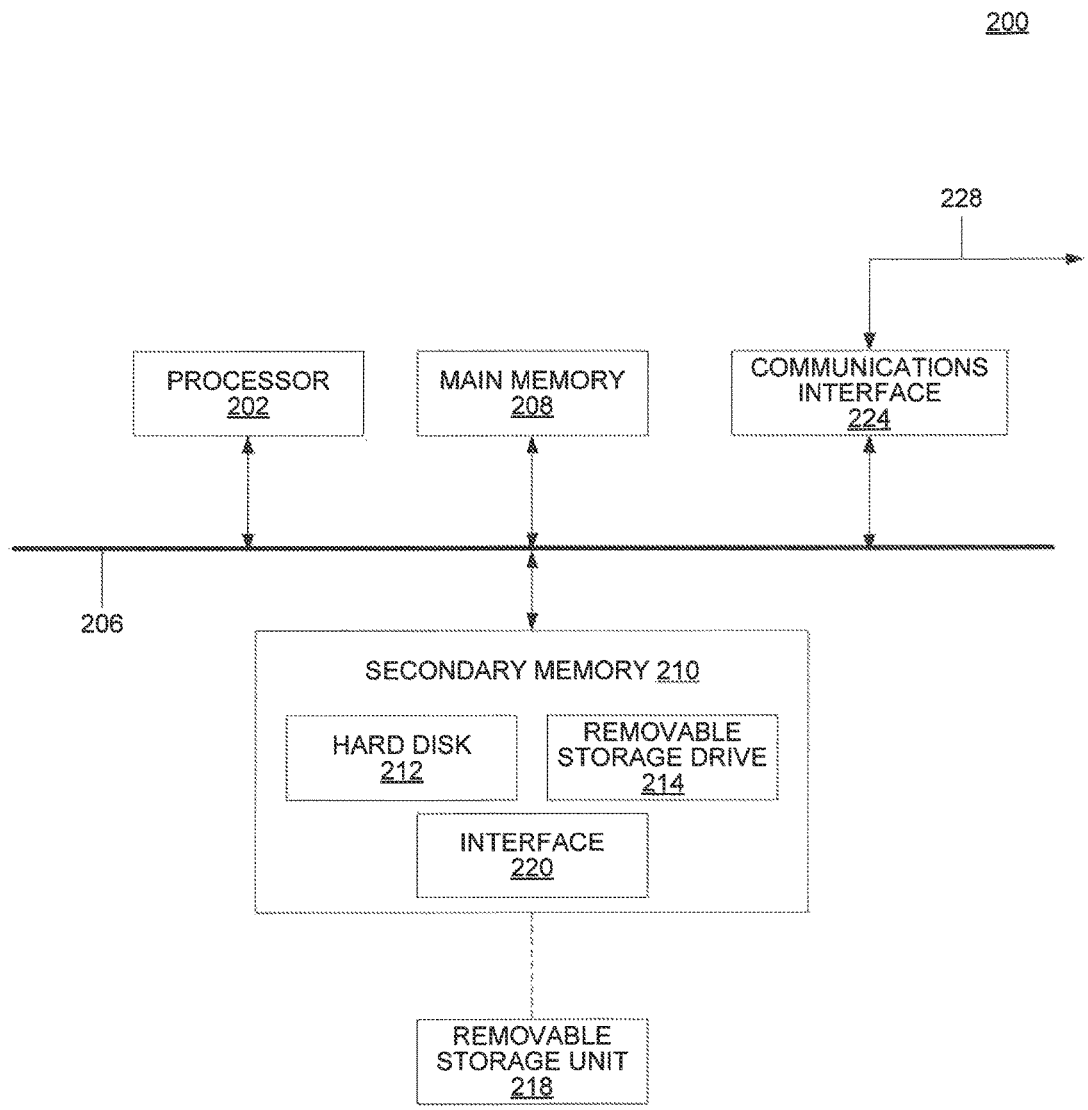
FIG. 2 depicts an exemplary computing system consistent with the disclosed embodiments.

FIG. 2 depicts a block diagram of exemplary computer system 200 with which certain aspects consistent with the disclosed embodiments may be implemented. For example, in some aspects, computer system 200 may reflect computer systems associated with a client device (e.g., client device 112, 122, 132, etc.), system 142, and the like. In some embodiments, computer system 200 may include one or more processors 202 connected to a communications backbone 206 such as a bus or external communications network (e.g., any medium of digital data communication such as a LAN, MAN, WAN, cellular network, WiFi network, NFC link, Bluetooth, GSM network, PCS network, communication network 125, and any associated protocols such as HTTP, TCP/IP, RFID, etc.).

In certain aspects, computer system 200 may include main memory 208. Main memory 208 may comprise random access memory (RAM) representing a tangible and non-transitory computer-readable medium storing computer programs, sets of instructions, code, or data executed with processor 202. When executed by processor 202, such instructions, computer programs, etc., enable processor 202 to perform one or more processes or functions consistent with the disclosed embodiments. In some aspects, such instructions may include machine code (e.g., from a compiler) and/or files containing code that processor 202 may execute with an interpreter.

In some aspects, main memory 208 may also include or connect to a secondary memory 210. Secondary memory 210 may include a disk drive 212 (e.g., HDD, SSD), and/or a removable storage drive 214, such as a magnetic tape drive, flash memory, an optical disk drive, CD/DVD drive, or the like. The removable storage drive 214 may read from and/or write to a removable storage unit 218 in a manner known to the skilled artisan. Removable storage unit 218 may represent a magnetic tape, optical disk, or other storage medium that is read by and written to by removable storage drive 214. Removable storage unit 218 may represent a tangible and non-transitory computer-readable medium having stored therein computer programs, sets of instructions, code, or data to be executed by processor 202.

In other embodiments, secondary memory 210 may include other means for allowing computer programs or other program instructions to be loaded into d computer system 200. Such means may include, for example, another removable storage unit 218 or an interface 220. An example of such means may include a removable memory chip (e.g., EPROM, RAM, ROM, DRAM, EEPROM, flash memory devices, or other volatile or nonvolatile memory devices) and associated socket, or other removable storage units 218 and interfaces 220, which allow instructions and data to be transferred from the removable storage unit 218 to computer system 200.

Computer system 200 may also include one or more communications interfaces 224. Communications interface 224 may allow software and data to be transferred between computer system 200 and external systems (e.g., in addition to backbone 206). Communications interface 224 may include a modem, a network interface (e.g., an Ethernet card), a communications port, a PCMCIA slot and card, etc. Communications interface 224 may transfer software and data in the form of signals, which may be electronic, electromagnetic, optical or other signals capable of being received by communications interface 224. These signals may be provided to communications interface 224 via a communications path (i.e., channel 228). Channel 228 carries signals and may be implemented using wire, cable, fiber optics, RF link, and/or other communications channels. In one embodiment, the signals comprise data packets sent to processor 202. Information representing processed packets may also be sent in the form of signals from processor 202 through communications path 228.

In certain aspects, the computer-implemented methods described herein can be implemented on a single processor of a computer system, such as processor 202 of computer system 200. In other embodiments, these computer-implemented methods may be implemented using one or more processors within a single computer system and/or on one or more processors within separate computer systems in communication over a network.

In certain embodiments in connection with FIG. 2, the terms "storage device" and "storage medium" may refer to particular devices including, but not limited to, main memory 208, secondary memory 210, a hard disk installed in hard disk drive 212, and removable storage unit 218. Further, the term "computer-readable medium" may refer to devices including, but not limited to, a hard disk installed in hard disk drive 212, any combination of main memory 208 and secondary memory 210, and removable storage unit 218, which may respectively provide computer programs and/or sets of instructions to processor 202 of computer system 200. Such computer programs and sets of instructions can be stored within one or more computer-readable media. In certain aspects, computer programs and sets of instructions may also be received via communications interface 224 and stored on the one or more computer-readable media.

The disclosed embodiments include systems, methods, and computer-readable mediums for storing instructions that, when executed by a processor(s), perform operations for notifying users when one or more devices associated with specified persons and/or specified business entities cross or are present within a geographic boundary (e.g., proximity detection). In certain embodiments, the geographic boundary may be associated with an expected arrival time of the one or more devices at a particular location. In some aspects, the disclosed embodiments may monitor the one or more devices relevant to the user, and may dynamically calculate one or more geographical boundaries based on information associated with the one or more monitored devices. In certain aspects, the disclosed embodiments may determine whether at least one of the monitored devices intersects the boundary and/or is disposed within the boundary, and provide a notification to a device of a user based on the determination.

In some aspects, the disclosed embodiments include notifying the user device under other conditions based on information associated with the one or more monitored devices. By way of example, notifications consistent with the disclosed embodiments may include, but are not limited to, notifications that at least one of the persons and/or specific business entities is delayed and will be unable to arrive at the particular location at the expected arrival time (e.g., at a previously scheduled appointment, such as a meeting at an office), and notifications that the expected arrival time (e.g., a start time of the previously scheduled appointment or meeting) has been rescheduled to accommodate the delay, as described below.

Figure 3A:
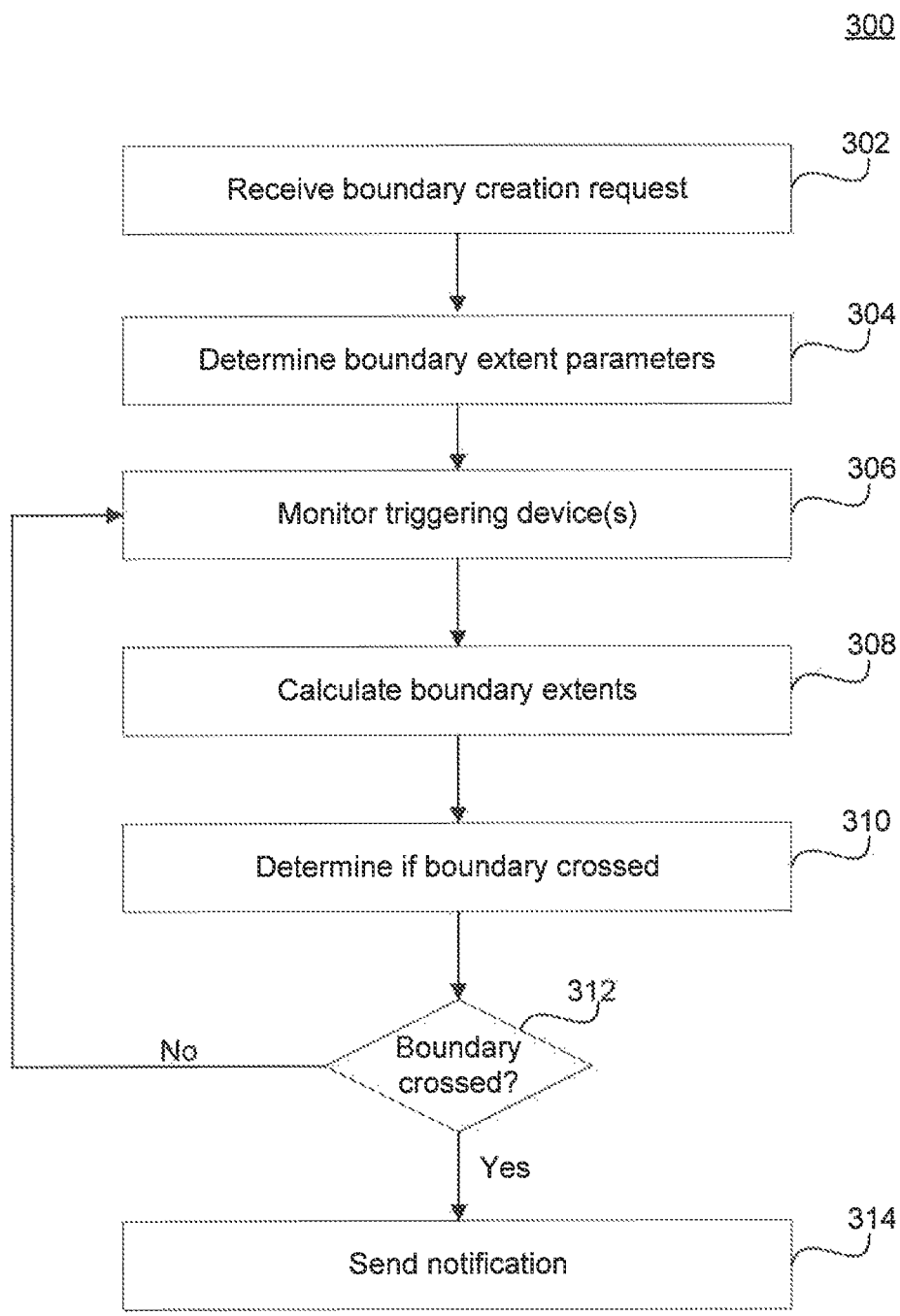
FIG. 3A depicts a flowchart for an exemplary proximity notification process consistent with the disclosed embodiments.

For example, FIG. 3A depicts a flowchart for an exemplary proximity notification process 300 consistent with the disclosed embodiments. In some aspects, system 142 may be configured to receive a boundary creation request consistent with the disclosed embodiments (step 302). In certain aspects, a boundary creation request may reflect an indication from a user to monitor devices related to the request (e.g., one or more triggering devices 122, 132, etc.) and determine the expected arrival time of one or more monitored devices at a particular target location or locations.

Based on the received boundary creation request, system 142 may determine a current location of client device 112, and establish (e.g., "freeze") the current location as the target location for a predetermined time period. In certain aspects, user 110 may leave the target location during the predetermined time (e.g., to run errands, etc.), and system 142 may monitor geographic locations of client device 112 (and of triggering devices 122 and 132). System 142 may, for example, be configured to compute times required for user 110 and triggering entities 120 and 130 to travel from their respective geographic locations to the target location.

By way of example, the travel times may be computed based on geographic data stored within various data stores (e.g., data repository 146 of FIG. 1), based on a current travel speed (e.g., as obtained from external positioning systems), current weather and traffic conditions, and/or a street grid associate with the geographic region.

In certain aspects, user 110 may wish to arrive back at the target location before the arrival of one or more of triggering entities 120 and 130. For example, triggering entity 130 may be associated with a cable provider that scheduled service call at user 110's home (e.g., the target location), between 12:00 p.m. and 6:00 p.m. Rather than waiting at home during the six-hour interval, user 110 may elect to leave the home and perform one or more errands within a local shopping area, The disclosed embodiments may, for example, be configured to monitor current geographic locations of client device 112 and triggering device 122 and 132, and to provide a notification to user 110 (e.g., through client device 112) that user 110 should travel back to the target location in order to arrive before the service personnel of the cable provider (e.g., associated with one or triggering devices 122 or 132). In some aspects, and upon receipt of the boundary creation request from client device 112, system 142 may establish a geographic buffer zone that includes the target location and is bounded by one or more virtual boundaries.

Figure 3B:
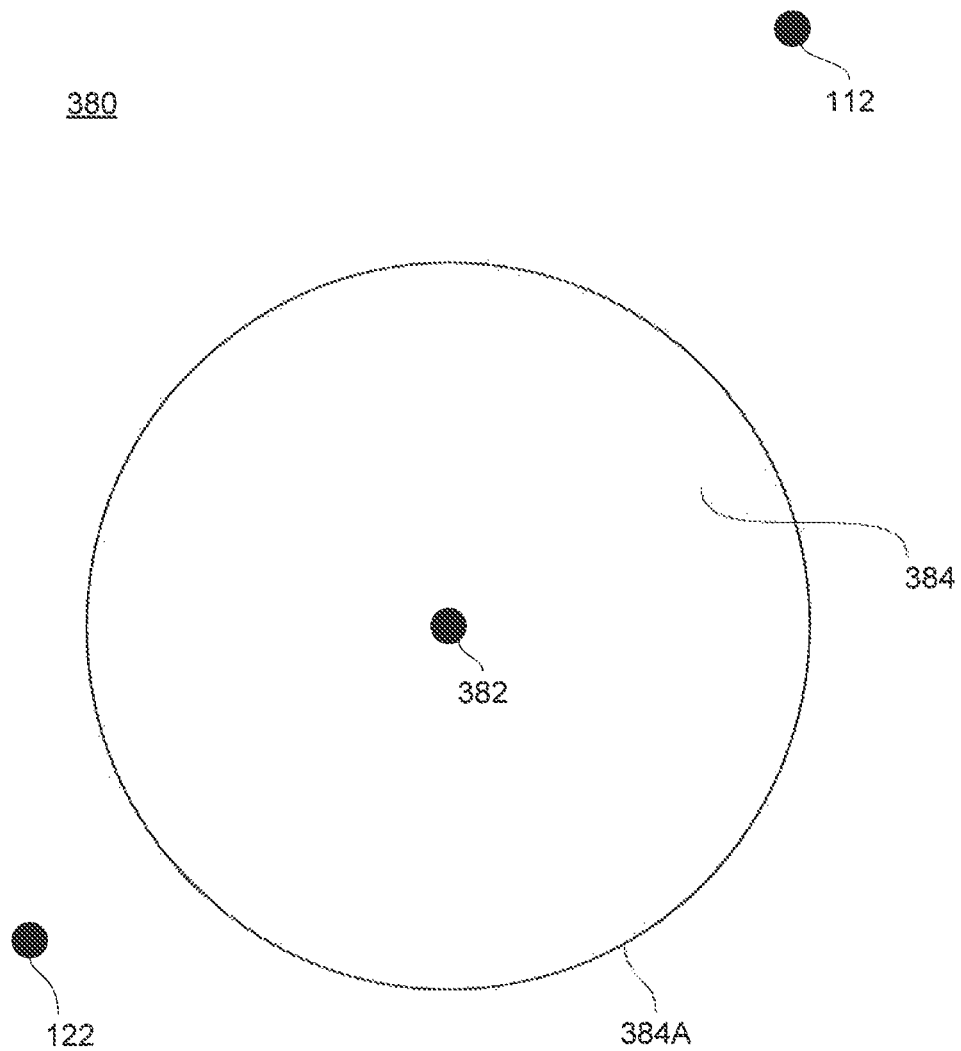
FIGS. 3B-3D depict exemplary boundary extent configurations consistent with the disclosed embodiments.

By way of example, as illustrated in FIG. 3B, system 142 may have established a target location 382 within geographic region 380, as described above, and may establish a geographic buffer zone 384 that includes target location 382 and is bounded by virtual boundary 384A. The number, location, size, extent, contours, shape, asymmetry, etc. of the virtual boundaries may depend on information consistent with the disclosed embodiments. In certain aspects, system 142 may determine the size of geographic buffer zone 384 and the location of virtual boundary 384A such that a time required by triggering entity 120 to travel from virtual boundary 384A to target location 382 exceeds a time required for user 110 to travel from its current geographic location to target location 382.

In further aspects, system 142 may adjust the size of geographic buffer zone 384 and the location of virtual boundary 384A based on, among other things, changes in the monitored geographic locations of client device 112 and triggering devices 122 and 132 and/or changes in the speeds at which client device 112 and triggering devices 122 and 132 travel within geographic region 380. In other instances, system 142 may adjust the size of geographic buffer zone 384 and the location of virtual boundary 384A to account for changes in traffic or weather conditions, police and/or fire department activity, and any additional or alternate parameter that may be monitored by system 142 and that impacts a time required by client device 112 and triggering devices 122 and 132 to reach target location 382.

For instance, as a displacement between client device 112 and target location 382 increases, and additionally or alternatively, as a displacement between triggering device 122 and target location 382 decreases, system 142 may adaptively compute the position of virtual boundary 384A within geographic region 380 to account for the changes in travel time and ensure that user 110 may nonetheless arrive at target location 382 prior to triggering entity 120. Further, by way of example, system 142 may adaptively modify the virtual boundary 384A in response to changes in traffic conditions (e.g., increases in traffic during rush hour), and/or police activity that would impact an ability of either triggering device 122 or user device 112 to be transported through geographic region 380.

Figure 3C:
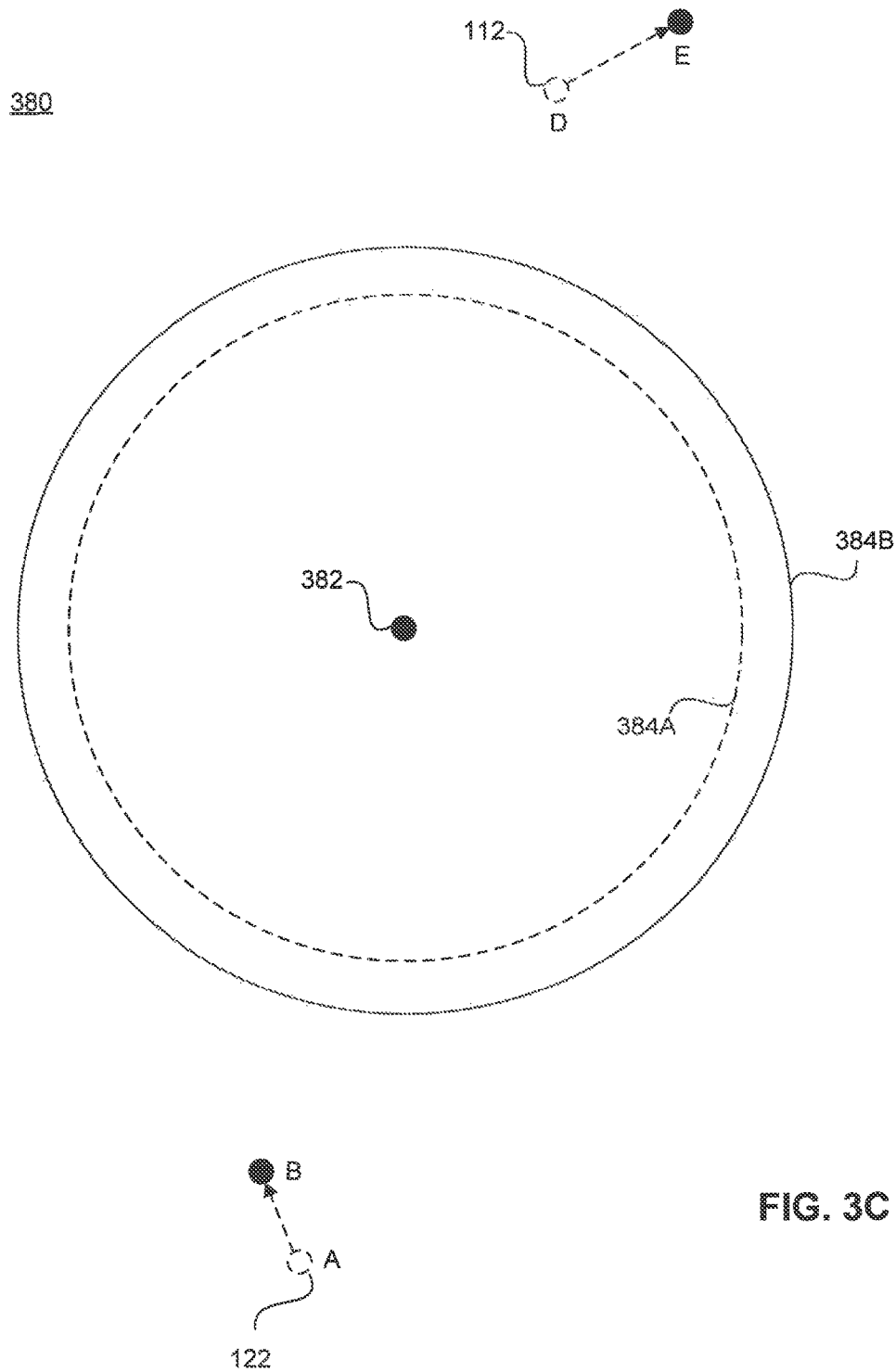

By way of example, and as illustrated in FIG. 3C, system 142 may detect that a geographic location of triggering device 122 moves within geographic region 380 from location "A" to location "B" and further, that a geographic location of client device 112 moves within geographic region from location "0" to location "E." In some aspects, system 142 may be configured to determine that a displacement between location "E" and target location 382 may exceed a corresponding displacement between location "B" and the target location. Further, based on the relative movement of devices 112 and 122, system 142 may determine that, based on current travel conditions (e.g., traffic conditions, weather conditions, emergency activity, relative speeds of devices 112 and 122, etc.), triggering device 122 may reach target location 382 prior to user device 112's arrival at target location 382. In some embodiments, system 142 may be configured expand prior virtual boundary 384A and compute a modified virtual boundary 384B that reflects the movement of client device 112 and triggering device 122 and ensures that user 110 arrives at target location 382 prior to triggering entity 120.

Figure 3D:
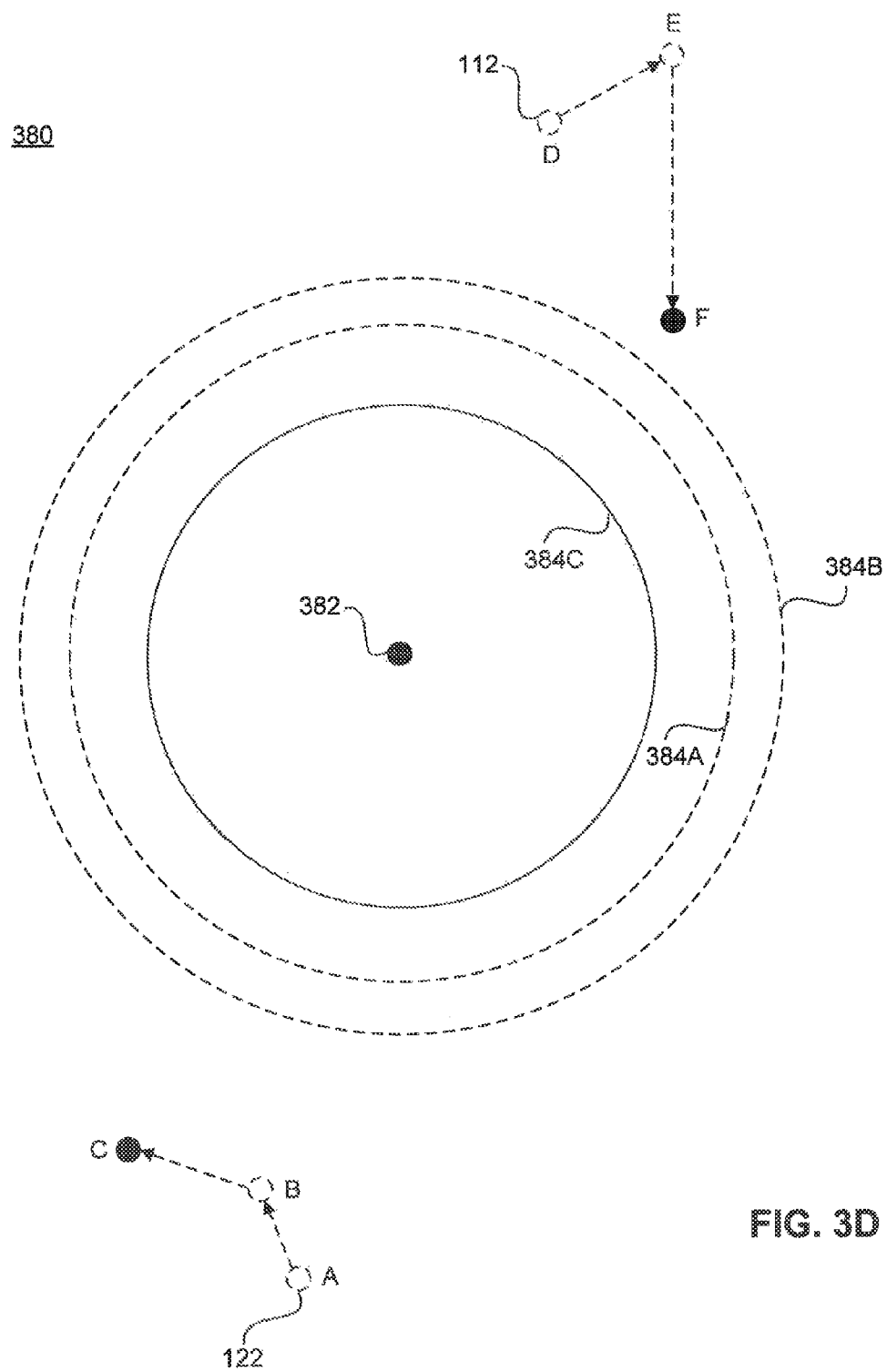

As described above, system 142 may continue to monitor the relative geographic location, speed, and/or travel direction of client device 112 and triggering device 122 within geographic region 380 (e.g., based on positional data received from corresponding GPS sensors incorporated into client device 112 and triggering device 122). For example, as depicted in FIG. 3D, system 142 may detect that a geographic location of triggering device 122 continues to move within geographic region 380 from location "B" to location "C" and further, that a geographic location of client device 112 moves within geographic region from location "E" to location "F." Further, system 142 may be configured to determine that a displacement between location "C" and target location 382 may exceed a corresponding displacement between location "F" and target location 382. Based on the continued movement of devices 112 and 122, system 142 may be configured to compute a modified virtual boundary 384B that, although representing a contraction of prior virtual boundary 384B, nonetheless ensures that user 110 arrives at target location 382 prior to triggering entity 120.

As described above system 142 may continue to monitor the relative geographic location, speed, and/or travel direction of client device 112 and triggering device 122 within geographic region 380. At regular intervals, or in response to substantial changes in location, speed, or direction (e.g., that exceed corresponding thresholds), system 142 may be configured to compute additional virtual boundaries that ensures that user 110 arrives at target location 382 prior to triggering entity 120. Further, although depicted as concentric circles disposed about target location 382 in FIGS. 3A, 3B, and 3B, the disclosed embodiments are not limited to these exemplary boundaries, and in further embodiments, system 142 may be configured to compute any regular and/or irregular boundary appropriate to geographic region 380. Moreover, although described in terms of a single client device (e.g., client device 112) and a single triggering device (e.g., triggering device 122), the disclosed embodiments are not limited to these exemplary numbers and types of devices, and in other embodiments, system 142 may be configured to monitor relative geographic locations, speeds, and/or travel directions of any additional or alternate number of client devices and/or triggering devices operable with system 140.

In some aspects, the received boundary creation request may represent a user's request to be notified when systems and/or devices associated with a triggering entity (e.g., triggering entity 120 and/or 130) intersect virtual boundary 384 in geographic region 380. As described above, the size, shape, and/or extent of the boundary may depend on any factor consistent with the disclosed embodiments. In one example, for instance, a boundary creation request may reflect a user's desire to be notified when a system (e.g., a triggering device associated with, for example, a cable company, pizza delivery service, courier, etc.), intersects a particular geographical boundary with characteristics determined by system 142 (e.g., virtual boundary 384A). In this example, by notifying user 110 when a cable company service vehicle, a pizza delivery car, and/or a shipping truck intersections virtual boundary 384A, user 110 may be able to travel from a current geographic location to target location before the cable company service vehicle, the pizza delivery car, and/or the shipping truck traverses the distance between virtual boundary 384A and target location 384.

Referring back to FIG. 3A, in some embodiments, the boundary creation request received in step 302 may comprise information that indicates a type of input delivered over communications network 125, such as an e-mail, and SMS text message, input provided over a website hosted on system 142, input provided to a mobile application running a client device (e.g., client device 112), and the like. In certain aspects, the boundary creation request may also include information that specifies one or more devices (e.g., one or more triggering devices) to be tracked and monitored by system 142, although such information is not required.

In certain embodiments, system 142 may be configured to determine one or more boundary extent parameters (step 304). In some embodiments, system 142 may be configured to determine boundary extent parameters that include information relevant to a boundary creation request. In certain aspects, information may be relevant to a boundary creation request when it may influence how system 142 calculates, processes, and/or determines the characteristics (e.g., the size, shape, etc.) of the virtual boundaries associated with the boundary creation request. In certain aspects, the boundary extent parameter(s) may include information associated with one or more triggering devices (e.g., triggering devices 122 and 132). In some embodiments, for instance, the boundary extent parameters may reflect information informing system 142 of an expected arrival time of one or more of the triggering devices at a location (or locations) specified in the boundary creation request. For example, in some aspects, boundary extent parameters may include a location of one of more of the triggering devices, a speed of one or more of the triggering devices, a direction of travel of one or more of the triggering devices, and the like (e.g., elevation, acceleration, etc.).

In some aspects, the boundary extent parameters may include other information potentially affecting an expected arrival time of a triggering device at a destination location associated with the request. For example, in one embodiment, the boundary extent parameters may include traffic information reflecting current, expected, or predicted traffic conditions between a triggering device and its destination location or other localities (e.g., known traveling routes). In certain aspects, traffic information may include any other type of information reflecting expected traffic conditions, such as current or expected weather patterns, etc.

In another embodiment, the boundary extent parameters may include priority information reflecting an expected, calculated, or known latency period associated with one or more of the triggering devices. In certain aspects, the latency period may represent a time period in which the triggering device will not be traveling en route to the location. For example, system 142 may be configured to determine whether a triggering device may be stopped at a particular locality (e.g., service stations, other user locations, break stations, etc.) or otherwise not en route to a destination location (e.g., due to known delivery or service schedules, expected breaks, etc.), and incorporate this information into the latency boundary extent parameter. As described above, system 142 may be compute current and ongoing times required for the triggering device to travel from a current geographic location to a target location established by system 142 in response to a request from user 110. In some aspects, system 142 may be configured to maintain a previously computed travel time for the triggering device during any latency period, and to compute and updated travel time, and further, updated positions of the virtual boundary (e.g., virtual boundary 384A of FIG. 3B) upon expiration of the latency period.

In another example, the boundary extent parameters may include a modified time parameter reflecting a desired duration of time that a user, notification entity 140, and/or triggering entity may wish to add, insert, and/or subtract from an expected arrival time at a destination route. For example, a user may wish to subtract a certain duration of time from the expected arrival time to ensure he or she is at the location before the triggering device arrives (e.g., a triggering device located on a courier truck, pizza delivery car, cable company van, a person, etc.).

In other aspects, the modified time parameter may reflect an amount of time required by user 110 and/or the one or more triggering entities to prepare for an event associated with the expected arrival time. For example, if a cable company van were scheduled to arrive at the user 110's home at 5:30 p.m., user 110 may wish to arrive home at 5:15 p.m. to ensure fifteen minutes of preparation time prior to the arrival of the cable van (e.g., to clean an area of the home in which the cable box is disposed). In one instance, user 110 may specify, as input to an interface rendered for presentation by client device 112, a modified time parameter of fifteen minutes to reflect the desired preparation time, which client device 112 may provide to system 142. In some embodiments, system 142 may determine a modified expected arrival time of 5:15 p.m. (e.g., as a boundary extent parameter in set 304), which reflects the desired fifteen minute preparation time in advance of the 5:30 p.m. arrival time, and may provide notifications and other proximity-detection processes consistent with the disclosed embodiments and in accordance with the modified expected arrival time.

In other aspects, the expected arrival time may reflect a scheduled appointment time of one or more individuals at a specified location. For example, user 110 may be an employee of a financial institution (e.g., a loan officer, a financial advisor, etc.), who may expect an arrival of one or more customers (e.g., triggering entity 122 and/or 132) at a branch of the financial institution for a previously scheduled appointment at 10:00 a.m. on a particular day. Due to the nature and subject matter of the appointment, user 110 (e.g., the employee) may anticipate that thirty minutes will be required to adequately understand the subject matter and prepare for the appointment. In certain instances, user 110 may specify, as input to an interface rendered for presentation by client device 112, a modified time parameter of thirty minutes to reflect the desired preparation time, which client device 112 may provide to system 142.

As described above, system 142 may determine a modified expected arrival time of 9:30 am. to reflect the desired preparation time (e.g., as a boundary extent parameter in set 304), and system 142 may provide notifications and other proximity-detection processes consistent with the disclosed embodiments and in accordance with the modified expected arrival time. For example, and as described below, system 142 may provide a notification to client device 112 indicating that user 110 should travel back to the location of the appointment in order to arrive by 9:30 a.m. which will afford the anticipated 30 minutes of preparation time before the arrival of the customer.

In other instances, system 140 may enable user 110 to specify a default modified time parameter (e.g., indicative of preparation time, etc.) for one or more types of events (e.g., client appointments, employee appointments, service calls, etc.) as an input to a corresponding interface rendered for presentation by client device 112. For example, user 110 may specify, as input to client device 112, a first default modified time parameter of fifteen minutes to reflect preparation time for employee appointments and a second default modified time parameter of thirty minutes to reflect preparation time for client appointments. In some aspects, system 142 may receive the default modified time parameters from client device 112 and store the default modified time parameters in a portion of data repository 144. Further, and as described above, system 142 may apply corresponding ones of the default modified time parameters to the appropriate events and compute modified expected arrival times that enable user 110 to arrive at corresponding locations with sufficient time to prepare for the corresponding events (e.g., client appointments, employee appointments, service calls, etc.).

In further aspects, boundary extent parameters consistent with the disclosed embodiments may include parameters identifying additional or alternate prerequisites for an event or appointment, and further, one or more technological or data requirements for the event or appointment. For example, user 110 may, in submitting a boundary creation request for a scheduled group meeting having multiple participants, specify (e.g., as input to an interface presented by client device 112) additional parameters indicating that the appointment requires access to desktop, laptop, and/or other computing device capable of accessing a presentation device (e.g., a projector, LCD screen, etc.). In other instances, the boundary creation request may be associated with a scheduled client appointment that requires specific legal documents, which may be identified by user 110 as a parameter provided to client device 112, as described above. In additional instances, the subject matter associated with a scheduled appointment may require an employee or other representative of a business (e.g., the financial institution) to possess specific governmental and/or professional certifications (e.g., a certification as a financial advisor, a license to trade securities, a bar license, etc.). In certain aspects, the disclosed embodiments may enable user 110 to specify the required governmental and/or professional certifications as parameters to parameters provided to client device 112, as described above.

As another example, the boundary extent parameters may include a limit parameter reflecting an absolute distance or time period associated with a geographical region. For example, in one aspect, a boundary extent parameter may represent a boundary associated with a particular distance (e.g., 10 miles) or time (e.g., 15 minutes) distance away from the destination location. In certain embodiments, the limit parameter may be one component of additional boundary extent parameters (e.g., establishing a maximum or minimum boundary region distance or time). In other embodiments, the limit parameter may reflect a request to be notified when one or more triggering devices is a set distance or expected time period away from the destination location or some other point of interest (e.g., the edge of a boundary).

In some aspects, the boundary extent conditions may also incorporate usage parameters reflecting a relationship between the triggering devices and the boundary creation request. For example, the boundary extent parameters may include a usage parameter reflecting whether a particular device is associated with a user (e.g., the device is user-associated), whether a particular triggering device corresponds to a particular location, boundary, and/or boundary request (e.g., for embodiments with multiple triggering devices and/or destination locations, etc.), and similar identifying information.

In certain aspects, system 142 may be configured to monitor one or more triggering devices to obtain, process, and track information associated with the determined boundary extent parameters to perform processes consistent with the disclosed embodiments (Step 306). For example, system 142 may be configured to obtain information from the triggering devices reflecting their location, speed, direction, elevation, etc., in order to respond to the boundary creation request (e.g., calculate the expected arrival times of one or more triggering devices).

In certain embodiments, system 142 may obtain additional information related to the boundary extent parameters from other computing or data processing systems. For example, in one embodiment, system 142 may be configured to store, receive, or obtain information related to traffic conditions (e.g., from systems configured to track traffic conditions), expected latency times, priority information (e.g., known schedules), and/or modified time parameters (e.g., as received from a client device, generated by the system, etc.). In another example, system 142 may be configured to obtain, gather, and process information associated with the boundary extent parameters (e.g., a location of a triggering device) from systems associated with social networking computing systems (e.g., social networking sites). In some aspects, system 142 may be configured to obtain information related to the boundary extent parameters over one or more communications networks (e.g., network 125).

In some embodiments, system 142 may be configured to calculate boundary extents of a proximity boundary about a destination location (step 308). In some aspects, a boundary extent may delimit the geographical area(s) of a boundary associated with an expected arrival time of one or more triggering devices at the destination location. For example, in one illustrative aspect, system 142 may be configured to obtain information related to a location and speed of a triggering device, traffic conditions, etc., and determine an expected arrival time of the triggering device based on this boundary extent information. In certain aspects, system 142 may be configured to convert this expected arrival time into a boundary extent reflecting the geographical boundaries to which a user may travel (e.g., by car, by foot, etc.) before the triggering device would be expected to arrive at the destination location before the user. System 142 may be configured to calculate, generate, and adaptively modify any calculated boundary extents through performing processes consistent with the disclosed embodiments (e.g., embodiments disclosed in connection with FIGS. 4 and 6A-6E).

In certain aspects, system 142 may be configured to determine whether the boundary extents have been crossed (e.g., a triggering device is located within the boundary extents) (step 310). For example, system 142 may be configured to determine the extents of all the boundaries associated with a particular boundary creation request and/or location, and determine if one or more of the triggering devices are located within the geographical area subtended by the determined boundaries. In certain embodiments, if system 142 determines that none of the triggering devices are located within the geographical extent (step 312, No), the system may be configured to continue to monitor the triggering devices (step 306). In some embodiments, if system 142 determines that one or more of the triggering devices are located within the boundary extent (step 312, Yes), the system may be configured to perform processes consistent with the disclosed embodiments.

In some aspects, system 142 may be configured to perform additional or alternative processes to determine whether a triggering device has effectively crossed (e.g., is located in) a boundary extent. For instance, in certain aspects in which one or more of the triggering devices may be associated with a user, system 142 may be configured to remove, exempt, or otherwise account for the user-associated triggering devices in its calculation (e.g., to avoid notifying a user merely because the user resides within the boundary extent).

As another example, system 142 may be configured to incorporate other boundary extent information into its determination. For example, in one embodiment, system 142 may be configured to obtain priority information relating a triggering device located within the boundary extents. In certain aspects, system 142 may account for the latency period associated with the priority information when determining whether the associated triggering device has effectively crossed the boundary extent. For example, system 142 may determine, based on prior calculations of travel speed, directions, etc., that one of three monitored triggering devices is located within a boundary extent. The triggering device may, however, be associated with a latency period of three hours, and system 142 may delay the generation and transmission of proximity notification to one or more client device until expiration of the latency period. In other aspects, system 142 may incorporate such information directly into its boundary extent calculation consistent with the disclosed embodiments.

In some aspects, system 142 may be configured to send a proximity notification to one or more client devices upon determining that one or more triggering devices have crossed a boundary extent (e.g., in step 314). In certain embodiments, the proximity notification may take any form consistent with the disclosed embodiments such as an e-mail, SMS text message, telephone message, pop notification, application notification (e.g., delivered to a mobile application running on the client device), or any other type of notice providing information to a client device. In some embodiments, one or more of the client devices receiving the proximity notification may be associated with a computing system or user who originated the boundary creation request, but such as relationship is not required. For example, in one aspect, system 142 may be configured to send a proximity notification to a client device associated with a third party and not the user originating the boundary creation request.

The proximity notification may include any information consistent with the disclosed embodiments (e.g., approximate time to arrival, location information, other information associated with a triggering device such as the triggering entity, a driver or other personnel associated with the triggering device or entity, and so on). In some embodiments, system 142 may account for other information before sending a proximity notification. For example, system 142 may determine that at least one of the triggering devices located within a boundary extent is associated with user 110. In certain aspects, system 142 may modify one or more of the exemplary notification processes to reflect the association of the at least one triggering device with user 110 (e.g., by determining not to send a notification when only a triggering device associated with user 110 is located within the boundary extent).

Figure 4:
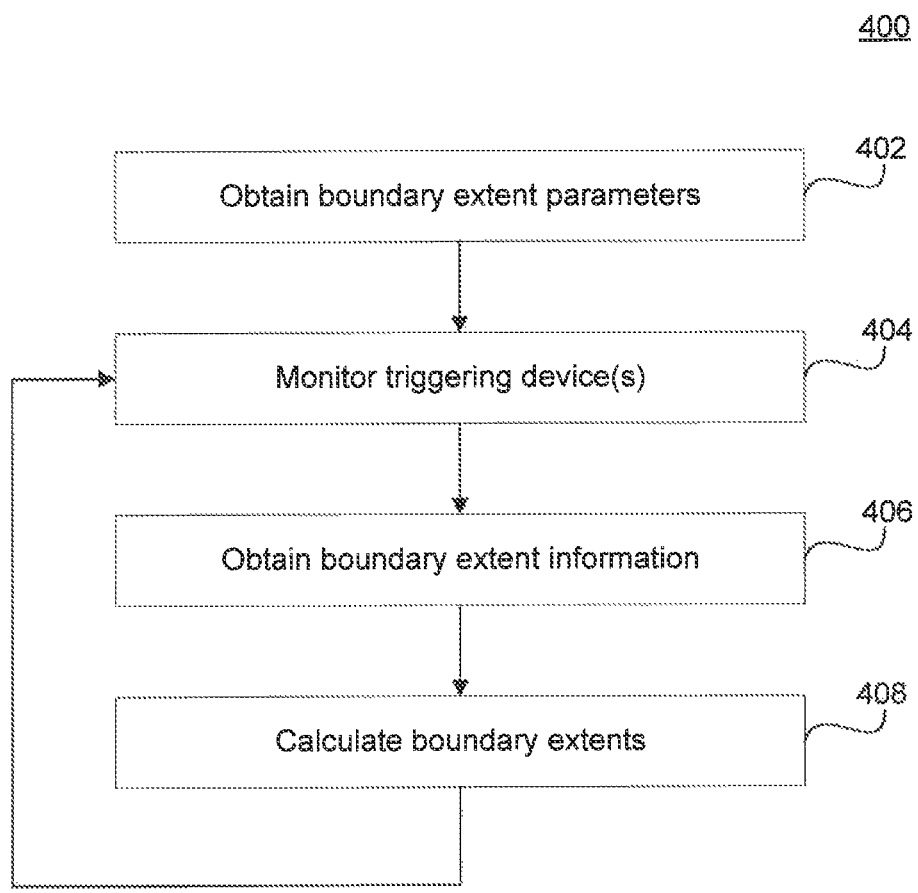
FIG. 4 depicts a flowchart for an exemplary boundary extent calculation process consistent with the disclosed embodiments.

FIG. 4 depicts a flowchart for an exemplary boundary extent calculation process 400 consistent with the disclosed embodiments. In some aspects, system 142 may be configured to determine and obtain one or more boundary extent parameters associated with a boundary creation request consistent with the disclosed embodiments (e.g., consistent with FIG. 3) (step 402). In certain aspects, system 142 may be configured to monitor one or more triggering devices for information associated with the one or more boundary extents (e.g., boundary extent information), and obtain the boundary extent information consistent with the disclosed embodiments (e.g., consistent with FIG. 3) (steps 404 and 406). System 142 may also be configured to obtain boundary extent information from other computing systems (e.g., systems associated with a social network, traffic monitoring service, weather service, etc.).

In some embodiments, system 142 may be configured to calculate boundary extents of a proximity boundary about one or more destination locations based in part on the boundary extent information (step 408). In some aspects, a boundary extent may delimit the geographical area(s) of a boundary associated with an expected arrival time of one or more triggering devices at the destination location. System 142 may be configured to calculate an expected arrival time of a triggering device by performing any of the processes consistent with the disclosed embodiments. In some aspects, system 142 may be configured to continually monitor the one or more triggering devices providing boundary extent information in order to dynamically update and refresh the calculated boundaries of a boundary extent (step 404).

In certain aspects, system 142 may be configured to calculate boundary extents for a single boundary by determining the expected arrival time of a single triggering device relevant to the boundary creation request at a destination location. System 142 may determine the characteristics of the boundary extents (e.g., the size, shape, range, etc.) based in part on information obtained from the triggering device, as well as other boundary extent information (e.g., information relating to lead times or priority parameters provided by a user or obtained from a third-party system, etc.).

In other aspects, system 142 may be configured to calculate one or more boundary extents by merging information from two or more triggering devices (e.g., a single boundary represents two or more triggering devices), by calculating a separate boundary for each monitored triggering device, by calculating one or more boundaries for only some triggering devices and not others, by calculating extents for more than one destination location, etc. System 142 may calculate the boundary extent using any information consistent with the disclosed embodiments (e.g., boundary extent information, other information obtained from system 142, etc.). For example, in one aspect, a user may provide information to system 142 comprising a modified time parameter reflecting a 10-minute lead-time by which the user desires to arrive before a triggering device. System 142 may be configured to implement other processes, such as assigning different weights to some or all of the boundary extent parameters (e.g., weight a device's speed over weather conditions, incorporate both into a predicted arrival time, etc.), and/or to some or all of the triggering devices (e.g., the arrival of one of the triggering devices is more or less important than the arrival of others, etc.).

In certain embodiments, system 142 may receive input from a client device (e.g., client device 112) directing system 142 to compute travel times and associated boundary extents such that the user will arrive at the destination before a specified one of a plurality of triggering devices (e.g., triggering device 122 or 132). In some aspects, system 142 may be configured to distinguish among the triggering devices it monitors to perform processes consistent with the disclosed embodiments. For example, in one aspect, system 142 may be configured to determine a difference in expected arrival times between the specified triggering device and other monitored triggering devices. In this example, system 142 may be configured to calculate boundary extents reflecting the geographical boundaries to which a user may travel to guarantee that the user arrives at the destination location before the specified triggering device. For example, the user may be traveling to a surprise birthday party for a triggering entity associated with the specified triggering device, and the user may, through the client device, provide instructions to enable system 142 to monitor and adjust boundaries based on the specified triggering device. System 142 may be configured to calculate the boundary extent using any information consistent with the disclosed embodiments (e.g., boundary extent information from the user-associated device such as location, speed, direction, information associated with the other triggering devices, other information obtained from system 142, etc.).

For example, a user may provide, through a web page, online portal, or interface presented by a client device, input specifying a boundary creation request to ensure that she is at a destination location (e.g., her home) before a cable company serviceman and package courier arrives at the user's home in accordance with predetermined scheduled appointments and/or meetings. The client device may, in some aspects, generate the boundary creation request based on the provided input, and transmit the generated request to system 142 using one or more of the communications protocols outlined above, In response to the received boundary creation request, system 142 may be configured to monitor one or more triggering devices associated with the cable company and the package courier to determine when the systems will arrive at her home. In certain embodiments, system 142 may be configured to convert these expected arrival times, and subtract them from an expected arrival time associated with the user-associated triggering device (e.g., her smartphone), thereby defining the geographical limits to which she may travel before she must return home.

Figure 5:
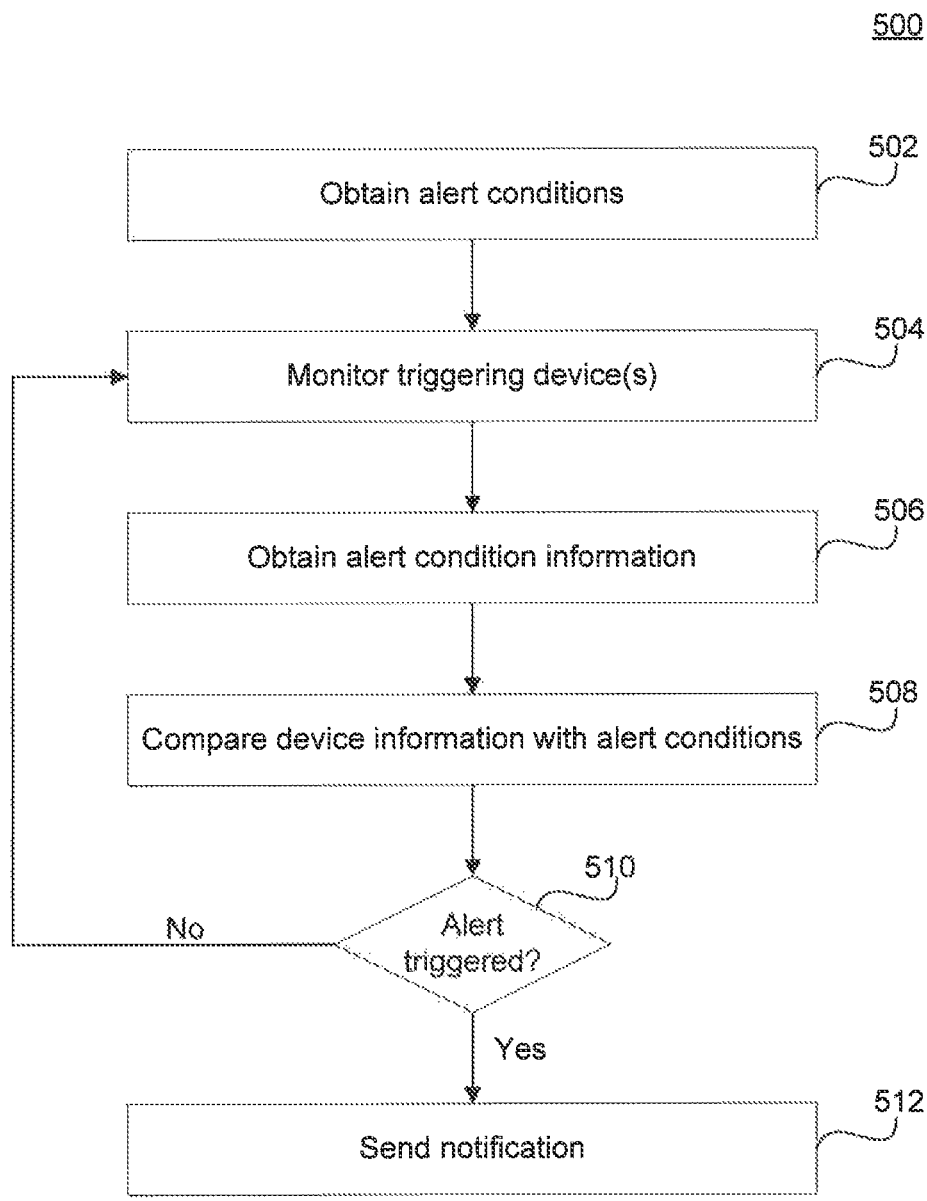
FIG. 5 depicts a flowchart for an exemplary alert notification process consistent with the disclosed embodiments.

In some embodiments, system 142 may be configured to provide notifications to one or more client devices in the absence of a triggering device crossing a boundary extent. For example, FIG. 5 depicts a flowchart for an exemplary alert notification process 500 consistent with the disclosed embodiments. In some aspects, system 142 may be configured to obtain one or more alert conditions associated with a boundary creation request (step 502). In certain embodiments, an alert condition may specify a circumstance under which system 142 may provide a notification to one or more client devices. In certain aspects, an alert condition may comprise a situation in which a triggering device crosses a boundary extent consistent with the disclosed embodiments (e.g., the embodiments described in connection with FIG. 3).

In some embodiments, an alert condition may also specify other circumstances under which system 142 may be configured to provide a notification to a client device. For example, in one aspect, an alert condition may comprise a boundary distance condition reflecting a predefined, variable, and/or maximum distance a triggering device may be from a destination location or edge of a boundary extent. In one illustrative embodiment, system 142 may be configured to send a notification to a client device when a triggering device (e.g., a user-associated triggering device, another device, etc.) is a predefined distance away (e.g., 20 miles) from the destination location or boundary extent. In another example, an alert condition may also reflect a predefined or established time period or point in time. In certain aspects, the time period may be a relative to some other time period or condition (e.g., 5 minutes before 3:00 p.m., 10 minutes after a meeting, 20 minutes from now, 15 minutes before a transmitting device is expected to cross a boundary extent, and similar conditions, etc.). In other aspects, the time period may be absolute (e.g., 2:45 a.m.).

In certain aspects, system 142 may be configured to assess multiple alert conditions before providing a notification to a client device. For example, in one aspect, system 142 may be configured to provide a notification to a client device at a particular time (e.g., 2:55) only if there are no triggering devices (or only user-associated triggering devices, only specified triggering devices, etc.) within the boundary extent. In another example, system 142 may be configured to provide a notification to a client device if a triggering device is a certain distance away from the destination location (e.g., 30 miles) only if there are no triggering devices (or only user-associated triggering devices, only specified triggering devices, etc.) within the boundary extent. As another example, system 142 may be configured to provide a notification to a user device when a triggering device associated with another entity is running late (e.g., is not located within a certain boundary extent at a particular time, is a certain threshold distance away from a destination location, etc.), and alert the user accordingly.

In some embodiments, system 142 may be configured to monitor one or more triggering devices to obtain, process, and track information associated with the determined boundary extent parameters to perform processes consistent with the disclosed embodiments (e.g., consistent with the embodiments described in connection with FIG. 3) (steps 504 and 506). For example, system 142 may be configured to obtain information from the triggering devices reflecting their location, speed, direction, elevation, and any other information consistent with boundary extent information or the one or more alert conditions. In some aspects, system 142 may incorporate additional information consistent with the disclosed embodiments (e.g., information stored on other computing systems, information derived from the obtained device information, etc.). For example, in some aspects, system 142 may be configured to obtain, generate, or receive information reflecting whether a triggering device is located within a boundary extent, whether a device is a user-associated device, whether a device is associated with a particular alert condition, and the like. In certain aspects, the information associated with the one or more alert conditions may be referred to as "alert condition information," but the use of such term is for illustrative purposes only and it not limiting.

In certain aspects, system 142 may be configured to compare the obtained alert condition information to the one or more alert conditions to determine if any of the conditions have been triggered (step 508). For example, system 142 may be configured to determine if one or more of the triggering devices is a predefined distance and/or an expected duration of time away from a destination location, whether one or more of the triggering devices is located within a boundary extent, etc. In certain aspects, if system 142 determined that none of the alert conditions have been triggered (step 510, No), then system 142 may be configured to continue to monitor the triggering device(s) and other computer systems providing alert condition information (e.g., external computer systems) consistent with the disclosed embodiments (step 504). In some embodiments, if system 142 determines that one or more of the alert conditions are satisfied (step 510, Yes), the system may be configured to perform processes consistent with the disclosed embodiments.

In some embodiments, system 142 may be configured to send an alert notification to one or more client devices upon determining that one or more alert conditions have been triggered. In certain embodiments, the alert notification may take any form consistent with the disclosed embodiments, such as an e-mail, SMS text message, telephone message, pop notification, application notification (e.g., delivered to a mobile application running on the client device), or any other type of notice providing information to a client device. The alert notification may include any information consistent with the disclosed embodiments (e.g., any information consistent with a proximity notification such as a time, place, location, etc.), including information associated with the alert conditions and/or alert condition information. In some aspects, system 142 may be configured to account for other information in determining whether to send an alert notification. For example, in some aspects, system 142 may be configured to determine whether it has already sent a proximity notification or another alert notification to a client device. In certain embodiments, system 142 may not send an alert notification if it has already sent a proximity detection or another alert notification (e.g., an alert notification concomitant with the alert at issue), but such determination is not required.

In certain aspects, system 142 may be configured to provide other kinds of information to user devices. In some embodiments, system 142 may be configured to provide information to one or more client devices for use in processes of other computing systems. For example, in one exemplary aspect, system 142 may be configured to determine that a triggering device associated with another user will be late to an appointment, meeting, or dinner occasion at a destination location (e.g., as specified by the time, and determined via processes consistent with the disclosed embodiments). In this example, system 142 may be configured to send coupons, offers, promotions, notices, or other information to one or more client devices associated with a boundary extent generated for the destination location (e.g., triggering devices determined to be friends with the late triggering device). FIGS. 6A-6E depicts exemplary boundary extent configurations consistent with the disclosed embodiments. The representations in FIGS. 6A-6E may be associated with information generated and stored by system 142, and may be used to perform one or more of the processes disclosed herein. In other aspects, the disclosed embodiments may use the information to generate a graphical representation reflecting the exemplary boundary extent configurations (and others) that may be displayed in a graphical form (or text form) in a display device.

Figure 6A:
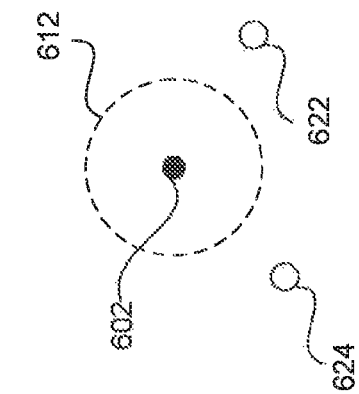
FIGS. 6A-6E depicts exemplary boundary extent configurations consistent with the disclosed embodiments.

For example, FIG. 6A depicts an exemplary boundary extent configuration in which system 142 has calculated a boundary extent 612 around a single destination location 602. System 142 may be configured to calculate boundary extent 612 by performing processes consistent with the disclosed embodiments (e.g., consistent with the embodiments disclosed in connection with FIGS. 3 and 4). In certain aspects, system 142 may be configured to calculate boundary extent 612 based in part on one or more boundary extent parameters consistent with the disclosed embodiments. In some aspects, system 142 may determine the extents, form, shape, range, etc. of boundary extent 612 based in part on information obtained from or associated with triggering device 622. For example, in one embodiment, system 142 may be configured to calculate boundary extent 612 based on a location, speed, direction, traffic conditions surrounding, and/or expected latency times associated with triggering device 622.

Figure 6B:
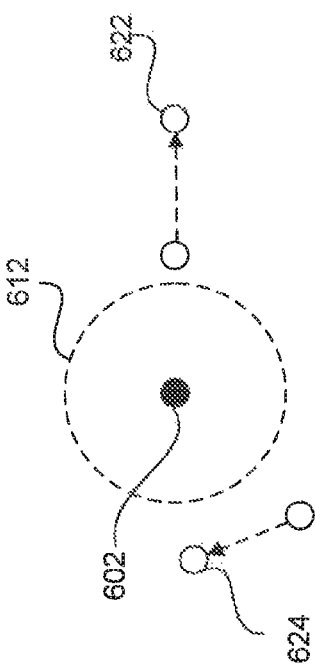
Figure 6C:
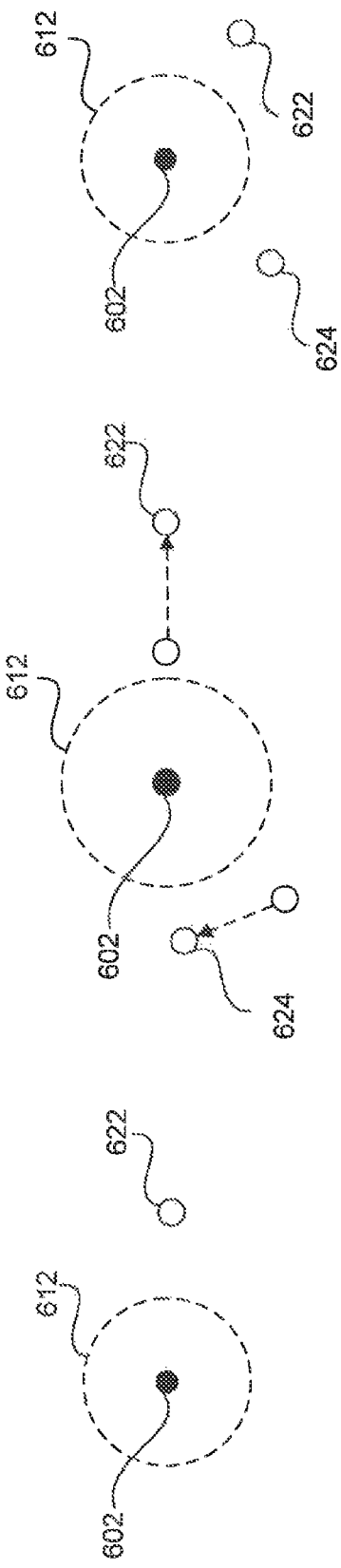

FIGS. 6B and 6C depict exemplary configurations where system 142 calculates a single boundary extent 612 associated with destination location 602. In these examples, system 142 may be configured to calculate boundary extent 612 based in part on information from two triggering devices 622 and 624. In certain aspects, for instance, system 142 may determine the bounds of boundary extent 612 based on the speed, location, movement, etc., of triggering devices 622 and 624. In some aspects, one of triggering devices 622 and 624 may include a user-associated triggering device. In certain embodiments, system 142 may be configured to determine the triggering devices that are user-associated, and account for this information in its calculation of the boundary extent, consistent with the disclosed embodiments.

Figure 6D:
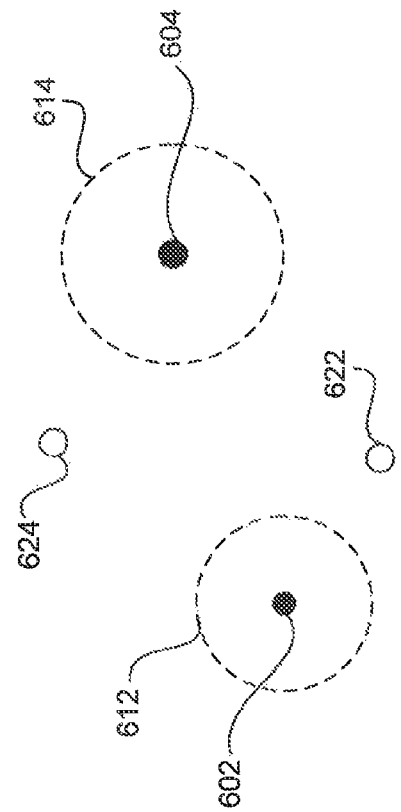

FIG. 6D depicts an exemplary configuration in which system 142 calculates two boundary extents 612 and 614 associated with a single destination location 602. In this example, system 142 calculates the configuration of the boundary extents from three triggering devices 622, 624, and 626. In certain aspects, system 142 may associate the triggering devices to one of the boundary extents 612 and 614. For example, system 142 may calculate boundary extent 612 based in part from information associated with (e.g., boundary extent information) triggering devices 622 and 626, and similarly may calculate boundary extent 614 based in part from information associated with triggering device 624. In another aspect, system 142 may associate one or more of the triggering devices (e.g., devices 622, 624, and 626) with any number of boundary extents. For example, in one illustrative aspect, system 142 may calculate boundary extents 612 and 614 based in part from information associated with triggering device 622. In these embodiments, system 142 may be configured to determine boundary extents from any relevant triggering devices, even those associated with other boundary extents.

Figure 6E:
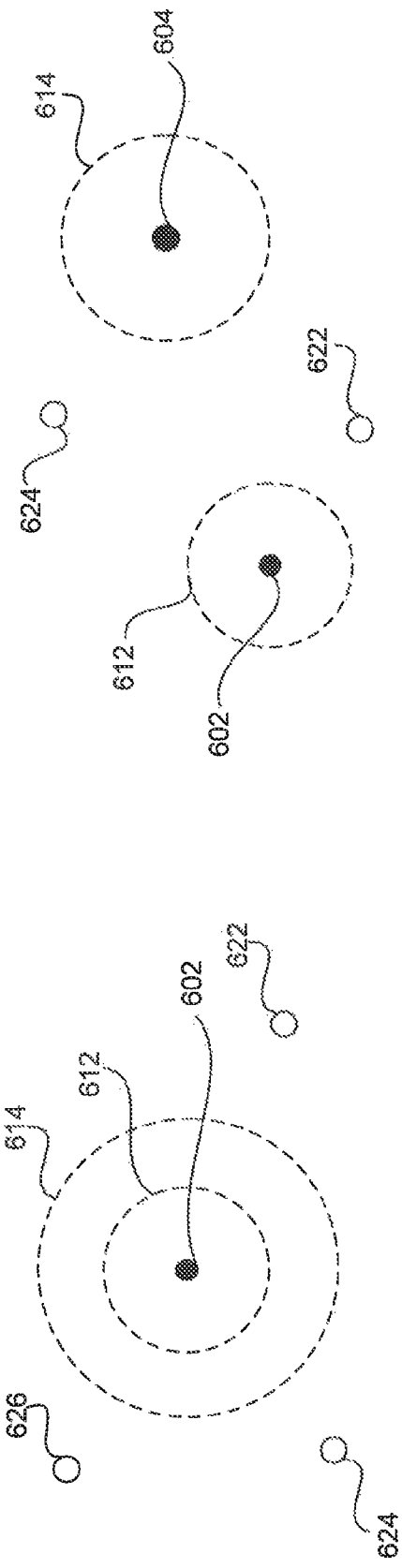

FIG. 6E depicts an exemplary configuration in which system 142 calculates two boundary extents 612 and 614 associated with a two destination locations 602 and 604. In this example, system 142 may be configured to associate boundary extent 612 with destination location 602, and boundary extent 614 with destination location 604. System 142 may be configured to determine the characteristics of the boundary extents by performing processes consistent with the disclosed embodiments. For example, system 142 may be configured to calculate the characteristics of boundary extents 612 and 614 based on information associated with triggering devices 622 and 624, respectively. In other aspects (e.g., aspects consistent with FIG. 6D), system 142 may be configured to determine the extents of a boundary (e.g., boundary 612) from information associated with any triggering device, such as both triggering devices 622 and 624. The disclosed embodiments include other combinations, permutations, extrapolations, and configurations, and the depiction of certain configurations is for illustrative purposes only, and is not limiting.

While the one or more boundary extents described in connection with FIGS. 6A-6F are depicted as circular regions, boundary extents consistent with the disclosed embodiments by take any shape, form, configuration, size, and/or asymmetry. For example, system 142 may calculate a boundary extent based on traffic conditions reflected in a traffic condition boundary extent parameter. In this example, it may be the case that traffic is heavier in particular regions or directions over others, and thus system 142 will calculate a non-uniform boundary extent. Other examples are possible (e.g., due to road design, speed limits on surrounding roads, accidents, information obtained from triggered devices, etc.), and the boundary extent may take any shape or size consistent with the disclosed embodiments.

As described above, the disclosed embodiments may enable a user (e.g., user 110) to enter into a notification arrangement with a triggering entity (e.g., triggering entity 120) such that a computerized system (e.g., system 142) provides a notification to a client device of user 110 (e.g., client device 112) that a device of a triggering entity (e.g., triggering device 122) intersects a virtual boundary established about a target location within a geographic region. In some instances, the virtual boundary may be adjusted based on relative speeds and positions of user 110 and triggering entity 120, local traffic conditions, police activity, and/or other events capable of impacting a travel within the geographic region. Further, by way of example, user 110 may, upon receipt of the notification by client device 112, travel from a current position to the specific position and arrive at the target location prior to triggering entity 120.

In some embodiments, the disclosed systems and methods may enable user 110 to establish a home as the target location, and arrive back home from errands or lunch prior to a scheduled arrival or a repair crew or delivery truck. In other aspects, user 110 may await a client's arrival at an office location for a scheduled appointment (e.g., a scheduled meeting). Just prior to the scheduled meeting, the client calls user 110 and lets user 110 know that he is stuck in a meeting and will arrive as soon as possible. The disclosed embodiments may enable user 110, through client device 112, to "freeze" the office location as the target location, and enter into a notification arrangement with the client such that system 142 provides a notification to user 110 when the client travels within an initial distance, e.g., three kilometers, of the target location. User 110 may, for example, leave the office and walk to a local bank branch, and based on local traffic and weather conditions, system 142 may adaptively modify a virtual boundary about the target location to ensure that user 110 will be able to travel back to office and arrive prior to the client. Upon presentation of the notification by client device 112, user 110 may begin travelling back to his office, e.g., the target location, and will arrive prior to the client.

In further embodiments, user 110 may plan to meet a prospective investor at a local restaurant to talk business over lunch. A meeting scheduled immediate prior to lunch has been cancelled, but the restaurant does not open for another hour. In certain aspects, user 110 may, through client device 112, "freeze" the restaurant location as the target location, and enter into a notification arrangement with the investor such that system 42 provides a notification to client device 112 when the potential investor crosses a virtual boundary adaptively established by system 142 about the target location. Further, through a web page, online portal, or other interface presented by client device 112, user 110 may specify that the target location should be frozen for ninety minutes, and system 142 should compute the position of the virtual boundary such that user 110 arrives at the restaurant ten minutes before the client. User 110 may then proceed to walk to a local coffee shop and work until client device 112 receives a notification that the potential investor intersected the virtual boundary at which time user 110 travels back to the restaurant and arrives ten minutes before the potential investor.

In other aspects, user 110 may anticipate a meeting with a business unit leader, but may be unsure if the business unit leader is running late or not. User 110 may, for example, walk to the meeting location, and using client device 112, may "freeze" the meeting location as the target location, and enter into a notification arrangement with the business unit leader. Having established the notification arrangement, user 110 may continue working without interruption until client device 112 receives a notification from system 142 that the business unit leader is close to the meeting location. User 112 may then proceed to the meeting location.

Further, in additional aspects, user 110 may arrive at a restaurant for a scheduled dinner before his date. User 110, however, had no idea that the restaurant required a formal dress code, and user 110 finds himself underdressed. Since user 110 lives near the restaurant, user 110 may decide to travel home and change into more formal attire. As described above, user 110 may input data into client device 112 instructing system 142 to establish the restaurant as the target location, and initiate a notification arrangement with the date. User 110 may then travel home, change, and since client device 102 has not received any notification from system 142, stop at a flower shop to pick up flowers for the date.

In other instances, user 110 may arrange a surprise birthday party for a friend, and may be charged with ensuring the friend arrives at the party after all of the guests. In some aspects, user 110 may input information into client device 112 that establishes notification arrangements between user 110 and each invited guest. Upon arriving to pick up the friend, user 110 may also enter information into client device 102 that establishes the friend's home as the target location, and further, instructed system 142 to establish a virtual boundary about the target location with a small radius that enables user 110 to arrive five minutes after the last invited guest. System 142 may, for example, provide notifications to client device 112 of the arrival of each invited guest at the location of the party, and upon receiving the final notification on client device 102 (e.g., of the final invited guest's arrival), user 110 may then escort the friend to the surprise birthday party.

In further aspects, user 110 may schedule an initial appointment with a customer (e.g., triggering entity 120) for 9:00 a.m, at user 110's office (e.g., a target location). User 110 may be attending a breakfast meeting at an additional location separated from user 110's office by a ten-minute subway ride. In some aspects, user 110 may submit (e.g., through an interface presented by client device 112) a boundary creation request to system 142 that requests system 142 monitor the customer's mobile device (e.g., triggering device 122) and notify user 110 when the customer's location falls within twenty minutes of user 110's office. As described above, user 110 may also specify additional boundary extent parameters upon submission of the request, which include, but are not limited to, one or more meeting and/or location prerequisites and one or more data and technological requirements. In certain aspects, system 142 may receive the boundary creation request from client device 112, and may be configured to monitor the positions of client device 112 and triggering device 122 relative to each other and a virtual boundary established about the target location using any of the exemplary techniques outlined above.

For example, system 142 may detect that triggering device 122 intersects with the virtual boundary disposed about the target location, i.e., that the customer's current geographic location is twenty minutes away from user 110's office based on current traffic conditions. In certain aspects, and using any of the exemplary techniques described above, system 142 may generate and transmit a notification of the customer's current position to client device 112 (e.g., an e-mail, SMS text message, telephone message, pop notification, application notification, etc.), which client device 112 may render for presentation to user 110. User 110 may view the notification, leave the breakfast meeting, and plan to take the ten-minute subway ride to user 110's office and arrive ten minutes before the customer's expected arrival time.

User 110 may, however, determine that a mechanical breakdown disabled a portion of the subway line required to reach the office (e.g., based on data from one or more third-party systems connected to system 142 across network 125), and user 110 may determine to walk the distance back to user 110's office. In certain aspects, system 142 may continue to monitor the relative geographic location, speed, and travel direction of client device 112 and triggering device 122 (e.g., based on positional data received from corresponding GPS sensors incorporated into client device 112 and triggering device 122), and may determine that user 110 will likely arrive at the target location at 9:40 a.m., i.e., ten minutes after the arrival of the customer at the target location.

In an embodiment, system 142 may be configured to generate and transmit a notification to triggering device 122 (e.g., an e-mail, SMS text message, telephone message, pop notification, application notification, etc.) using any of the exemplary techniques described above (e.g., in reference to FIG. 5). For example, the generated notification may alert the customer to user 110's delay and further, may identify to the customer the expected arrival time of user 110 (e.g., 9:40 a.m.). Triggering device 122 may receive the transmitted notification, and render the received notification for presentation to the customer, e.g., through a corresponding interface. In some aspects, and upon receipt of the notification, the customer may slow a pace of travel and/or stop off at a local Starbucks™ for coffee with the confidence that he or she will arrive at the target location prior to or concurrently with user 110. In certain aspects, the exemplary notification processes outlined above may alert the customer to user 110's delay automatically and without intervention from user 110.

Although described above in terms of a single customer device (e.g., triggering device 122) associated with a single customer (e.g., triggering entity 120), and a single client device 112 associated with user 110, the disclsoed embodiments are not limited to these exemplary numbers of devices and associated parties (e.g., triggering entities, users, and clients). In other aspects, the disclosed embodiments enable system 142 to monitor locations, speeds, and directions of travel of any additional or alternate client and/or triggering devices associated with any additional or alternate number of parties, determine whether the client and/or triggering device intersect one or more adaptively determined virtual boundaries about corresponding target locations, and further, generate and transmit notifications of the determined intersection to any of the client and/or triggering devices.

For example, in some aspects, the 9:30 a.m. meeting scheduled by user 110 may multiple include customers (e.g., having a business or familial relationship with each other) travelling to user 110's office from various locations and using various modes of transportation. In some embodiments, the multiple customers may be associated with one or more corresponding customer devices (e.g., multiple triggering devices 122 and 132), and system 142 may be configured to detect when at least one of the customer devices (e.g., at least one of triggering devices 122 or 132) intersect with a virtual boundary established by system 142. As described above, in response to the detected intersection, system 142 may be configured to generate and transmit a notification to client device 112, which client device 112 may render for presentation to user 110. Further, as described above, system 142 may determine that user 110 will likely arrive at the target location after the expected arrival times of the multiple customers, and system 142 may be configured to generate and transmit a notification to each of the customer devices (e.g., triggering devices 122 or 132) alerting the customers to user 110's delay and further, may identify to the customers the expected arrival time of user 110 (e.g., 9:40 am.).

Further, and as described above, system 142 may monitor current geographic locations, speeds, and directions of travel associated with devices held by various individuals and/or associated entities (e.g., user 110, and various human and non-triggering entities). As described above, system 142 may provide notifications to one or more customer devices (e.g., triggering devices 122 and/or 132) indicative of a delay associated with user 110's arrival at a meeting previously scheduled with one or more customers at user 110's office. In additional aspects, however, system 142 may determine that one or more of user 110's colleagues are also travelling to user 110's office, and are not impacted by the delay on the subway line. For example, system 142 may monitor a client device associated with a first colleague of user 110, and may determine based on the monitored geographic location, speed, and direction of travel of the first colleague's client device, that the first colleague is likely to arrive at user 110's office at 9:20 a.m., ten minutes prior to the scheduled meeting with the one or more customers.

In an embodiment, system 142 may be configured to determine whether the first colleague of user 110, who system 142 predicts will arrive at user 110's office ten minutes prior to the scheduled meeting, is capable of handling the meeting in place of user 110. For example, and as described above, user 110 may specify one or more one or more meeting prerequisites, location prerequisites, and/or data and technological requirements upon submission of a boundary creation request associated with the scheduled meeting (e.g., as input to an interface presented to user 110 by client device 112). In some aspects, system 142 may determine whether any of the specified meeting prerequisites, location prerequisites, and/or data and technological requirements would preclude system 142 from "handing-off" the scheduled meeting to the first colleague of user 110 in view of user 110's anticipated delayed arrival.

For example, the scheduled meeting may require copies of specific legal and financial documents, which may be stored electronically in one or more data repositories associated with a business entity that employs user 110 and the first colleague (e.g., a financial institution), and may thus be accessible to both user 110 and the first colleague. In other instances, user 110 may possess hard copies of all or a portion of the required legal and financial documents, which may not be accessible to the first colleague when user 110 is away from the office. Further, in some instances, the scheduled meeting may be associated with specific computational resources (e.g., computers capable of accessing projectors and/or LCD screen) and further, particular networking resources (e.g., secured networks associated with the financial institution). Additionally or alternatively, the subject matter of the meeting may require that an employee or representative of the financial institution conducting the meeting possess one or more governmental or professional certifications, as described above. The disclosed embodiments are, however, not limited to these exemplary meeting prerequisites, location prerequisites, and/or data and technological requirements, and in further aspects, scheduled meetings and events consistent with the disclosed embodiments may be associated with any additional or alternate prerequisite or requirement, including default prerequisites or requirements, appropriate to the subject matter of the scheduled meeting and the financial institution.

In an embodiments, system 142 may access information identifying the specified meeting prerequisites, location prerequisites, and/or data and technological requirements (e.g., as stored within a portion of data repository 146). Based on the accessed information, system 142 may determine whether a potential hand-off of the scheduled meeting from user 110 to the first colleague would be consistent with the specified meeting prerequisites, location prerequisites, and/or data and technological requirements.

If system 142 were to determine that the hand-off of the scheduled meeting from user 110 to the first colleague of user 110 would be consistent with the specified meeting prerequisites, location prerequisites, and/or data and technological requirements, system 142 may determine that the first colleague should handle the scheduled meeting in user 110's stead, and system 140 may be configured to generate notifications indicative of the hand-off, which may be transmitted to devices associated with user 110 (e.g., client device 112), the one or more customers (e.g., triggering devices 122 and 132), and the client device of the first colleague using any of the exemplary techniques described above. System 142 may, in some aspects, be configured to modify a portion of stored data (e.g., within data repository 146) associated with the boundary creation request to delete an association between the requested boundary creation and user 110, and establish and store (e.g., in data repository 146) an association between the requested boundary creation and the first colleague.

Alternatively, system 142 may determine that the proposed hand-off to the first colleague may be inconsistent with at least one of the specified meeting prerequisites, location prerequisites, and/or data and technological requirements. For example, user 110 may specify, when submitting the boundary creation request for the scheduled meeting, that the meeting requires a thirty-minute preparation period. In certain aspects, system 142 may determine that the proposed hand-off from user 110 to the first colleague is inconsistent with the specified meeting prerequisites, as system 142 predicts that the first colleague will arrive at user 110's office ten minutes prior to the scheduled meeting. Alternatively, system 142 may determine that the scheduled meeting requires documents in user 110's possession, or that the subject matter of the scheduled meeting indicates a professional certification that the first colleague lacks. In certain instances, and in response to these determinations, system 142 may determine that the proposed handoff of the scheduled meeting to the first colleague would be incompatible with at least one of the specified meeting prerequisites, location prerequisites, and/or data and technological requirements. In certain aspects, system 142 may take no action to modify stored data (e.g, within data repository 146) that associated the boundary creation request with user 110 and client device 112.

In certain embodiments described above, the exemplary proximity detection and notification processes may be configured to monitor relative geographic locations, speeds, and/or travel directions of various client devices and various triggering devices within a geographic region. For example, as described above, these client and triggering devices may be held by or be associated with various parties, such as users, business entities, governmental entities, etc. The disclosed embodiments are, however, not limited to any specific number of client devices (e.g., client device 112) or number of triggering devices (e.g., triggering devices 122 or 132). In further aspects, system 142 may be configured to provide proximity detection and notification processes consistent with the disclosed embodiments to any additional or alternate number of client or triggering devices associated with any additional or alternate partiers, which may be associated with boundary creation requests submitted for any number of appointments or meetings (e.g., a single meeting, multiple consecutive meetings, etc.).

In some aspects, the disclosed embodiments may be configured to perform delivery proximity and notification processes for parties attending previously schedule meetings and/or parties facilitating and/or awaiting previously scheduled deliveries and/or arrivals of repair crews, cable crews, etc. The disclosed embodiments are, however, not limited to these exemplary events, and in other aspects, an event associated with the exemplary proximity detection and notification processes may include any additional or alternate appointment (e.g., a meeting, etc.) having a scheduled start time and/or a scheduled location.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

What is claimed is:

1. A system, comprising: a storage device; and at least one processor coupled to the storage device, the storage device storing software instructions for controlling the at least one processor when executed by the at least one processor, the at least one processor being operative with the software instructions and being configured to:
   receive, from a client device, a request to establish a first boundary about a target location, the request specifying a triggering device;
   determine a first boundary extent parameter relevant to expected arrival times of the client device and the triggering device at the target location;

monitor the client device and the triggering device to obtain first boundary extent information reflecting the first boundary extent parameter, the client device and the triggering device being connected to the system across a corresponding network;

establish, based on the first boundary extent information, a first travel time that reflects a movement of the client device from a current geographic location to the target location;

calculate, based on the first boundary extent information and the first travel time, a first boundary extent delimiting a first geographical area of the first boundary disposed about the first location, wherein a second travel time associated with a movement of the triggering device from the first boundary extent to the target location exceeds the first travel time;

detect, based on the first boundary extent information, whether the triggering device is located within the first boundary extent;

receive a request to establish a second boundary around the target location, the second boundary reflecting a calculated difference in arrival times at the target location of the triggering device and an additional triggering device;

monitor the triggering device and the additional triggering device to obtain second boundary extent information reflecting a second boundary extent parameter, the second boundary extent parameter corresponding to the expected difference in arrival times;

calculate a second boundary extent delimiting a geographical area of the second boundary based on the second boundary extent information;

determine whether the triggering device or the additional triggering device is located within the second boundary extent; and transmit a first notification to a client device, when the triggering device is detected within the first boundary extent, and when the triggering device or the additional triggering device is determined to be located within the second boundary extent.

2. The system of claim 1, wherein the first boundary extent parameter includes: a location parameter reflecting a location of the triggering device; a speed parameter reflecting a speed of the triggering device; a direction parameter reflecting a direction of the triggering device; a traffic parameter reflecting traffic conditions between the triggering device and the target location; a modified time parameter reflecting a duration of time preceding a time at which the triggering device is expected to reach the target location; or a priority parameter reflecting an expected latent period associated with the triggering device devices.

3. The system of claim 1, wherein:
the client device is associated with a first user;
the triggering device is associated with a second user; and
the target location corresponds to a location of a scheduled meeting, the first user and the second user being attendees of the scheduled meeting.

4. The system of claim 3, wherein the at least one processor is further configured to obtain, from the client device, information identifying (i) a prerequisite associated with the meeting or (ii) a data requirement associated with the meeting.

5. The system of claim 4, wherein:
the obtained prerequisite information identifies a preparation time associated with the meeting; and the at least one processor is further configured to calculate the first boundary extent based on the first boundary extent information and the obtained prerequisite information, the first boundary reflecting the preparation time.

6. The system of claim 1, wherein the at least one processor is further configured to assign (i) a first weight to the first boundary extent information associated with the first boundary extent parameter or (ii) a second weight to the triggering device.

7. The system of claim 1, wherein the at least one processor is further configured to:
obtain, from the client device and the triggering device, sensor data indicative of geographic locations of corresponding ones of the client and triggering devices; and
generate the first boundary extent information based on the sensor data.

8. The system of claim 7, wherein the at least one processor is further configured to:
determine, based on the sensor data and the first boundary extent information, that the client device is expected to arrive at the target location after the expected arrival time of the triggering device; and
transmit a second notification to the triggering device, the second notification identifying the expected arrival time of the client device at the target location.

9. The system of claim 1, wherein the at least one processor is further configured to:
determine whether the first boundary extent information has triggered an alert condition; and
transmit the first notification to the client device when the alert condition is determined to be triggered, the alert condition specifying conditions under which the client device should receive the first notification, and the alert condition including a location distance condition reflecting a distance between the location and the triggering device or a late condition reflecting that the triggering device is expected to arrive at the target location after the expected arrival time.

10. The system of claim 1, wherein the triggering device includes an additional client device or a device associated with a non-human entity.

11. The system of claim 1, wherein the at least one processor is further configured to transmit the first notification to an additional client device.

12. The system of claim 1, wherein the first notification includes information indicating that the triggering device is located within the first boundary extent.

13. The system of claim 1, wherein the at least one processor is further configured to:
determine whether the triggering device is located within the second boundary extent; and
transmit a second notification to the client device, when the triggering device is determined to be located within the second boundary extent.

14. The system of claim 1, wherein the at least one processor is further configured to obtain information associated with the triggering device from a social networking site.

15. A computer-implemented method, comprising:
receiving, by one or more processors, a request from a client device to establish a first boundary about a target location, the request specifying a triggering device;
determining, by the one or more processors, a first boundary extent parameter relevant to expected arrival times of the client device and the triggering device at the target location;
monitoring, by the one or more processors, the client device and the triggering device to obtain first boundary extent information reflecting the first boundary extent parameter, the client device and the triggering device being connected to the system across a corresponding network;

establishing, by the one or more processors, a first travel time that reflects a movement of the client device from a current geographic location to the target location based on the first boundary extent information;

calculating, by the one or more processors, and based on the first boundary extent information and the first travel time, a first boundary extent delimiting a first geographical area of the first boundary disposed about the target location, wherein a second travel time associated with a movement of the triggering device from the first boundary extent to the target location exceeds the first travel time;

detecting, by the one or more processors, whether the triggering device is located within the first boundary extent;

receiving, by the one or more processors, a request to establish a second boundary around the target location, the second boundary reflecting a calculated difference in arrival times at the target location of the triggering device and an additional triggering device;

monitoring, by the one or more processors, the triggering device and the additional triggering device to obtain second boundary extent information reflecting a second boundary extent parameter, the second boundary extent parameter corresponding to the expected difference in arrival times;

calculating, by the one or more processors, a second boundary extent delimiting a geographical area of the second boundary based on the second boundary extent information;

determining, by the one or more processors, whether the triggering device or the additional triggering device is located within the second boundary extent; and when the triggering device is detected within the first boundary extent, and when the triggering device or the additional triggering device is determined to be located within the second boundary extent, transmitting, by the one or more processors, a first notification to a client device.

16. The computer-implemented method of claim 15, wherein the first boundary extent parameter includes: a location parameter reflecting a location of the triggering device; a speed parameter reflecting a speed of the triggering device; a direction parameter reflecting a direction of the triggering device; a traffic parameter reflecting traffic conditions between the triggering device and the target location; a modified time parameter reflecting a duration of time preceding a time at which the triggering device is expected to reach the target location; or a priority parameter reflecting an expected latent period associated with the triggering device devices.

17. The computer-implemented method of claim 15, wherein:
the client device is associated with a first user;
the triggering device is associated with a second user;
the first target location corresponds to a location of a scheduled meeting, the first user and the second user being attendees of the scheduled meeting; and
the computer-implemented method further comprises obtaining, by the one or more processors, from the client device, information identifying (i) a prerequisite associated with the meeting or (ii) a data requirement associated with the meeting.

18. The computer-implemented method of claim 17, wherein:
the obtained prerequisite information identifies a preparation time associated with the meeting; and the computer-implemented method further comprises calculating, by the one or more processors, the first boundary extent based on the first boundary extent information and the obtained prerequisite information, the first boundary reflecting the preparation time.

19. The computer-implemented method of claim 15, wherein the calculating further comprises assigning (i) a first weight to the first boundary extent information associated with the first boundary extent parameter or (ii) a second weight to the triggering device.

20. The computer-implemented method of claim 15, wherein:
the monitoring comprises monitoring the client device and the triggering device to obtain sensor data indicative of geographic locations of corresponding ones of the client and triggering devices; and
the method further comprises generating, by the one or more processors, the first boundary extent information based on the sensor data.

21. The computer-implemented method of claim 20, further comprising:
based the sensor data and the first boundary extent information, determining, by the one or more processors, that the client device is expected to arrive at the first location after the expected arrival time of the triggering device; and
transmitting, by the one or more processors, a second notification to the triggering device, the second notification identifying the expected arrival time of the client device at the first location.

22. The computer-implemented method of claim 15, further comprising:
determining, by the one or more processors, whether the first boundary extent information has triggered an alert condition; and
transmitting, by the one or more processors, the notification to the client device when the alert condition is determined to be triggered, the alert condition specifying conditions under which the client device should receive the notification, and
the alert condition including a location distance condition reflecting a distance between the first location and the triggering device or a late condition reflecting that the triggering device is expected to arrive at the target location after the expected arrival time.

23. The computer-implemented method of claim 15, wherein:
the triggering device includes an additional client device or a device associated with a non-human entity;
the transmitting further comprises transmitting the notification to an additional client device; and
the first notification reflects that the triggering device is located within the first boundary extent.

24. The computer-implemented method of claim 15, further comprising:
determining, by the one or more processors, whether the triggering device is located within the second boundary extent; and
when the triggering device is determined to be located within the second boundary extent, transmitting, by the one or more processors, a second notification to the client device.

25. The computer-implemented method of claim 15, wherein the monitoring includes obtaining information associated with the triggering device from a social networking site.

26. A tangible, non-transitory computer-readable medium storing instructions that, when executed by at least one processor, cause the at least one processor to perform a method, comprising:
receiving a request from a client device to establish a first boundary about a target location, the request specifying a triggering device;
determining a first boundary extent parameter relevant to expected arrival times of the client device and the triggering device at the target location;
monitoring the client device and the triggering device to obtain first boundary extent information reflecting the first boundary extent parameter, the client device and the triggering device being connected to the system across a corresponding network;
establishing a first travel time that reflects a movement of the client device from a current geographic location to the target location based on the first boundary extent information;
calculating, based on the first boundary extent information and the first travel time, a first boundary extent delimiting a first geographical area of the first boundary disposed about the first location, wherein a second travel time associated with a movement of the triggering device from the first boundary extent to the target location exceeds the first travel time;
detecting whether the triggering device is located within the first boundary extent;
receiving a request to establish a second boundary around the target location, the second boundary reflecting a calculated difference in arrival times at the target location of the triggering device and an additional triggering device;
monitoring the triggering device and the additional triggering device to obtain second boundary extent information reflecting a second boundary extent parameter, the second boundary extent parameter corresponding to the expected difference in arrival times;
calculating a second boundary extent delimiting a geographical area of the second boundary based on the second boundary extent information;
determining whether the triggering device or the additional triggering device is located within the second boundary extent; and
transmitting a first notification to a client device, when the triggering device is detected within the first boundary extent, and when the triggering device or the additional triggering device is determined to be located within the second boundary extent.

27. The system of claim 1, wherein:
the current geographic position of the client device corresponds to a first geographic location; and
the at least one processor is further configured to detect a change in the current geographic position of the client device, the change being indicative of a movement from the first geographic position to a second geographic position.

28. The system of claim 27, wherein the at least one processor is further configured to:
compute a modified first travel time in response to the detected change in the current geographic location of the client device, the modified first travel time reflecting a movement of the client device from the second geographic location to the target location;
calculate, based on the first boundary extent information and the modified first travel time, a modified first boundary extent delimiting a geographical area of modified first boundary disposed about the target location, wherein a third travel time associated with a movement of the triggering device from the modified first boundary extent to the target location exceeds the modified first travel time;
determine that the triggering device is disposed within the modified first boundary extent; and
transmit a second notification to a client device, in response to the determination that triggering device is disposed within the modified first boundary extent.

29. The system of claim 1, wherein the at least one processor is further configured to determine that the triggering device is expected to arrive at the first location prior to the client device based on the first boundary extent information.

30. The system of claim 29, wherein the at least one processor is further configured to:
in response to the determination, calculate a modified first boundary extent delimiting a geographical area of a modified first boundary disposed about the target location, wherein a third travel time associated with a movement of the triggering device from the modified first boundary extent to the target location exceeds the first travel time;
determine that the triggering device is disposed within the modified first boundary extent; and
transmit a second notification to the client device in response to the determination that the triggering device is disposed within the second boundary.

* * * * *